US008548887B2

(12) United States Patent
Gardner et al.

(10) Patent No.: US 8,548,887 B2
(45) Date of Patent: Oct. 1, 2013

(54) METHOD OF EVALUATING THE PERFORMANCE OF A FAMILY OF TARGET DATE FUNDS

(75) Inventors: Grant W. Gardner, University Place, WA (US); Ashwani Sirohi, Issaquah, WA (US); Wesley G. Seagraves, Charlotte, NC (US)

(73) Assignee: Frank Russell Company, Tacoma, WA (US)

( * ) Notice: Subject to any disclaimer, the term of this patent is extended or adjusted under 35 U.S.C. 154(b) by 748 days.

(21) Appl. No.: 12/102,640

(22) Filed: Apr. 14, 2008

(65) Prior Publication Data

US 2009/0048958 A1 Feb. 19, 2009

Related U.S. Application Data

(60) Provisional application No. 60/956,645, filed on Aug. 17, 2007.

(51) Int. Cl.
*G06Q 40/00* (2012.01)

(52) U.S. Cl.
CPC ..................................... *G06Q 40/00* (2013.01)
USPC ...................................................... 705/36 R

(58) Field of Classification Search
CPC ...................................................... G06Q 40/00
USPC ................................................. 705/35, 36 R
See application file for complete search history.

(56) References Cited

U.S. PATENT DOCUMENTS 6,564,191 B1 * 5/2003 Reddy ......................... 705/36 R
2007/0005474 A1 * 1/2007 Ho et al. ........................ 705/35

OTHER PUBLICATIONS

No Author, "Viewpoints: Benchmarking Success for Target Date Funds" "Capital Guardian Trust Company." pp. 1-5.*

* cited by examiner

*Primary Examiner* — Ella Colbert
(74) *Attorney, Agent, or Firm* — Davis Wright Tremaine LLP; George C. Rondeau, Jr.; Heather M. Colburn

(57) ABSTRACT

A method of evaluating the performance of a family of target date funds. A model of the family is constructed using realized rates of return ("returns") for an evaluation period for each of the funds. The returns for each fund are assigned to the periods of the model corresponding to the periods during which the return was realized by the fund. An estimate of the wealth generated by the family may be determined as a function of the returns assigned to the model and a pattern of contributions. A benchmark portfolio may be selected and used to construct a model of the benchmark portfolio having the same number of periods as the model of the family. The model of the benchmark and the pattern of contributions may be used to determine wealth generated by the benchmark portfolio, which may be compared to the estimate of wealth generated by the family.

39 Claims, 13 Drawing Sheets

METHOD OF EVALUATING THE PERFORMANCE OF A FAMILY OF TARGET DATE FUNDS

CROSS REFERENCE TO RELATED APPLICATION(S)

This application claims the benefit of U.S. Provisional Application No. 60/956,645, filed Aug. 17, 2007.

BACKGROUND OF THE INVENTION

1. Field of the Invention

The present invention is directed generally to methods of evaluating the performance of a family of target date funds.

2. Description of the Related Art

The term "target date fund" refers to a relatively new kind of diversified mutual fund that is intended to maximize wealth generated by the fund as of a particular "target year" or "target date." For most target date funds, the year portion of the target date is of greater importance than the month or day. Although, it is conceivable modifications to some target date funds may someday include finer gradations.

Because a target data fund is concerned with future wealth generated as of a particular date, fund providers typically offer a plurality of target date funds (referred to as a "suite" or "family") each having a different target date. FIG. 1 provides an illustration of an exemplary Family "F1" including nine target date funds, TDF1-TDF9. Currently most, if not all, target date fund families offered by fund providers include target date funds having target dates that occur at regular intervals, such as every five years, every ten years, and the like. For example, the target date funds, TDF1, TDF2, TDF3, TDF4, TDF5, TDF6, TDF7, TDF8, and TDF9 have the following target dates: 2010; 2015; 2020; 2025; 2030; 2035; 2040; 2045; and 2050, respectively.

Each target date fund in the Family "F1," has an accumulation phase and a deccumulation phase. During the accumulation phase, an investor in the target date fund contributes to the fund. Generally, an investor makes periodic (and hopefully regular) contributions into the fund. The accumulation phase ends on the target date. Generally, the accumulation phase of each of the target date funds within a family has the same duration (e.g., about 45 years). Therefore, the accumulation phase for each target date fund begins on a different start date. For example, the accumulation phase of the target date funds, TDF1, TDF2, TDF3, TDF4, TDF5, TDF6, TDF7, TDF8, and TDF9 begin in the following years: 1965, 1970, 1975, 1980, 1985, 1990, 1995, 2000, and 2005, respectively. As is apparent to those of ordinary skill in the art, the Family "F1" may have been created after the start dates of one or more of the target date funds TDF1-TDF9. The deccumulation phase begins on the target date and does not necessarily have a predetermined end date. During the deccumulation phase, the investor may divest from the fund, converting the investment back into cash. However, in some cases, the investor may choose to invest in the fund during the deccumulation phase. Further, the investor may choose to leave at least a portion of his/her investments made during the accumulation phase invested in the fund during at least a portion of the deccumulation phase.

Each target date fund includes a plurality of assets each belonging to an asset class (stocks, bonds, cash equivalents, etc.). During the accumulation phase, the amount of money invested in each of the asset classes is varied according to an investment strategy that dictates the portion of the fund invested in each of the asset classes. Generally, as the fund approaches its target date, the investment strategy shifts the portion of the assets in the fund belonging to each of the plurality of asset classes towards a more conservative mix. During the deccumulation phase, the amount of money invested in each of the asset classes may also be varied according to the investment strategy or may remain constant. As mentioned above, the Family "F1" may have been created after the start dates of one or more of the target date funds TDF1-TDF9. In such cases, no money was invested in any of the funds before the creation date of the family. However, for each fund TDF1-TDF9, the same time varying investment strategy is used to determine the portion of the fund invested in each of the asset classes.

A fund manager makes decisions related to asset allocation, diversification, and rebalancing over the accumulation and deccumulation phases of the target date fund. In other words, the fund manager selects appropriate asset classes, allocates among them, and devises what he considers to be the optimal investment strategy within each asset class.

Within a family (e.g., the Family "F1"), the money invested in each of the target date funds is allocated according to the same investment strategy. However, different families typically have different investment strategies. Over the duration of a particular investment strategy, the amount of money invested in each asset class varies. By adjusting the portion of the assets in the fund belonging to each of the plurality of asset classes, the target data fund attempts to maximize wealth generated by the fund by the target date.

An investor may select a particular target date fund within the target date fund Family "F1" in which to invest based on a major event in the investor's life, such as the start of the investor's retirement, start of college for a child, and the like. The investor typically selects the target date fund within the family having a target date that is closest to the major life event. For example, if in 2007, a 53-year old person were contemplating retirement at age 65, that person would likely have chosen to invest in the target date fund that has a target date closest to his/her retirement date, which was about 12 years into the future. Therefore, in Family "F1," this person is likely to choose fund TDF3, which has a target date of 2020.

Target date funds can be helpful for investors who prefer to use a single investment to save for a particular investment goal or life event. Some investors think of target date funds as an investment vehicle with "cruise control." Besides choosing the right fund (using the target date closest to the life event), the investor's only other real task is to contribute regularly to the fund chosen. The fund is responsible for using the already invested capital and the new periodic contributions to maximize wealth generated by the fund at target date.

Target date funds are usually marketed as a family. The name of each target date fund within the family typically includes its target date or target year. For example, target date funds may have names like "Portfolio 2015," "Retirement Fund 2030," "Target 2040," "Lifecycle 2045," and the like. As with most mutual funds, target date funds can be sold through a variety of distribution channels and using a variety of fee structures. Standard symbols such as "A," "B," etc. may be added to the end of the name of a particular target date fund to reflect a method of sale and/or fee structure.

Russell LifePoints is a real world example of a family of target date funds. The Russell LifePoints family includes the Russell LifePoints 2010, Russell LifePoints 2020, Russell LifePoints 2030, and so on. If the same 53-year old person mentioned above who was contemplating retirement in 2007 at age 65 decided to invest in a fund of the Russell LifePoints family, he/she would likely choose the Russell LifePoints 2020 fund because its target date is closest to the person's contemplated retirement date.

A target date fund typically invests in a set of underlying funds (or in some other proxy for an asset class or style) and the amount of the target date fund allocated to a particular underlying fund changes over the life of that target date fund. This rebalancing takes place periodically and may occur as often as daily or as infrequently as every few years depending on the investment strategy of the target date fund family.

Fund providers typically do not disclose their investment strategies to the public. However, a fund provider may at its own discretion disclose its investment strategy to a plan administrator. The investment strategy includes a glide path. The term "glide path" refers to the shape of a plot of the portion of the target date fund invested in equities over the duration of the accumulation phase. Because all of the funds within a family are allocated using the same investment strategy, the glide path for each fund is substantially identical. Therefore, the glide path may be described as a property of the family of target date funds as well as a property of the individual target date funds in the family.

For illustrative purposes, in FIG. 2, an example glide path 10 of a conventional target date fund family is shown. The y-axis shows the percentage of equity allocation (i.e., the amount of the fund invested in equity asset classes) within the target date fund. The x-axis illustrates the years of the accumulation and deccumulation phases of the target date fund. Year 0 is the target date. Year 45 is the beginning of the accumulation phase; therefore, Years 45 to 0 correspond to the accumulation phase and years 0 to +30 correspond to the deccumulation phase. As FIG. 2 illustrates, the equity allocation is highest at the beginning of the accumulation phase and continues to decrease over time. In other words, the "glide path" is downward sloping and shows a decrease in equity allocation occurring over time.

For an investor, such as a defined benefit plan sponsor, selecting among the increasing variety of new target date products is a formidable task. As mentioned above, fund providers typically do not disclose their investment strategies or glide paths to the public. While a hallmark of target date funds is their simplicity of use, their design is complex and there is no commonly accepted framework for designing them. Investors often hear compelling but different stories from asset management firms. Many times, even a plan's consultant struggles to understand the nuances in design of these new and rapidly evolving investment vehicles. While selection of an appropriate target date fund within a family is somewhat straight forward, the prior art includes no methods or tools for comparing target date fund families. Therefore, the prior art offers the investor no guidance whatsoever in selecting a target date fund family from which to select a target date fund.

One of the fundamental problems in selecting a target date fund family is the lack of an objective, returns-based measure of performance that is appropriate for evaluating target date funds. While investment decisions should never be based solely on past performance, any responsible fiduciary choosing among families of target date funds is going to ask the following questions: how have they performed; have they done better than some simple but reasonable benchmark; and how has a particular family of funds performed relative to its peers? The plan sponsor and/or investors may also want to know how to determine whether a particular target date fund has performed in accordance with representations made by investment managers.

Unfortunately, measures traditionally used to evaluate the performance of (non-target date) mutual funds are unsuitable for use with target date funds. To report performance, regular mutual fund performance measures use standardized, time-weighted portfolio returns over various periods such as one month, one year, etc. Similar regular mutual funds are grouped into similar strategy and/or style categories of a performance universe. A passive market index is sought that is most similar to a particular group of mutual funds being analyzed. The time-weighted portfolio returns for these regular mutual funds and the corresponding benchmarks are then reported for one more evaluation periods (e.g., one year, three years, five years, and ten years). An example of this traditional performance reporting is shown below in the Table 1.

TABLE 1

Fund Performance Annualized Periods Ending Mar. 31, 2007

|  | 1-Year | 3-Years | 5-Years | 10-Years |
| --- | --- | --- | --- | --- |
| Russell Equity I Fund | 10.28% | 11.58% | 7.55% | 8.27% |
| Russell 1000 ® Index | 11.84% | 10.73% | 6.92% | 8.61% |
| S&P 500 ® Index | 11.83% | 10.06% | 6.27% | 8.20% |

This conventional analysis works well for regular single-asset-class mutual funds and regular multi-asset-class mutual funds that have static asset allocations. However, as described earlier, target date funds are managed to a target date and thus their allocations change over time.

Therefore, in a particular market condition, a selected target date fund may outperform a peer fund. However, the very same target date fund may or may not outperform the very same peer fund five or ten years in the future under identical market conditions because the underlying fund allocations would have changed over the five or ten years. For example, suppose for 2007, Fundco's 2020 fund had a higher one-year return than SaveMart's 2020 fund. Nevertheless, for 2012, Fundco's 2020 fund may have a lower one-year return than SaveMart's 2020 fund even if market conditions remained constant. Consequently, traditional performance measures fall short when applied to target date funds.

Additionally, while for 2007, Fundco's 2020 fund outperformed SaveMart's 2020 fund, SaveMart's 2040 fund may have outperformed Fundco's 2040 fund. Generally, a plan sponsor offers investors the target date family of Fundco or SaveMart and does not offer a selected target date fund from SaveMart and another target date fund from Fundco. Therefore, investing in Fundco's 2020 fund and SaveMart's 2040 fund may not be possible.

Analyzing target date funds on a fund-by-fund basis leads to arbitrary conclusions that are not helpful in making decisions. What should an investor do if Fund A has a good 2040 fund but a bad 2010 fund and, Fund B has a bad 2040 fund and a good 2010 fund? It is not practical to invest in Fund A's 2040 fund and Fund B's 2010 fund.

Knowing one fund outperformed another provides little or no useful information that may be used to evaluate the performance of a target date fund with respect to the goal of maximizing wealth at a target date. In other words, this information does not help an investor determine whether he/she will achieve, fall short, or exceed a target wealth goal on the target date. Therefore, knowing one fund outperformed another provides no practical actionable information to either investors or plan sponsors.

Determining how a family of target date funds has performed relative to a reasonable benchmark is problematic because selecting a benchmark is complicated by the fact that different target date funds in the family are likely to have different asset allocations on the same dates (as dictated by the investment strategy). Therefore, a passive benchmark for each fund would have to match the investment strategy of the fund.

One intuitively appealing idea to remedy this problem is to have "benchmark" target date fund having an asset allocation that is varied according to a benchmark investment strategy. While index providers have made efforts to create such a benchmark investment strategy, there is no obvious candidate for an industry standard. Each index provider, as well as each asset manager, uses different assumptions about contributions, asset class returns, goals, and risk aversion when constructing an investment strategy for a family of target date funds. There are also fundamental differences in methodology between investment strategies. Because there is no common industry consensus regarding investment strategy methodology and assumptions, there is little hope of having a benchmark investment strategy that is generally accepted.

A target date fund uses contributions invested over time to create wealth at the target date. Therefore, an effective performance measure of target date fund performance should incorporate contributions made to the funds. Because traditional time-weighted returns remove the effect of the timing of cash flows (e.g., contributions) by design, they are unsuitable for evaluating the ability of a target date fund to generate wealth by the target date. Specifically, time-weighted returns ignore the fact that returns in the final few years before the target date have much more impact on the retirement wealth of a typical investor than returns in the early years. Thus, an appropriate performance measure for a target date fund should give greater importance to returns nearer the target date.

Therefore, a need exists for a returns-based, objective measure of the performance of a family of target date funds. It is also desirable to have a measure of the performance of a family of target date funds that determines the propensity of the funds to build wealth. It would also be beneficial to identify an implementable benchmark portfolio that could function as an alternative strategy to investment in the family of target date funds. The present application provides these and other advantages as will be apparent from the following detailed description and accompanying figures.

BRIEF DESCRIPTION OF THE SEVERAL VIEWS OF THE DRAWING(S)

DETAILED DESCRIPTION OF THE INVENTION

Definition of Terms

Figure 1:
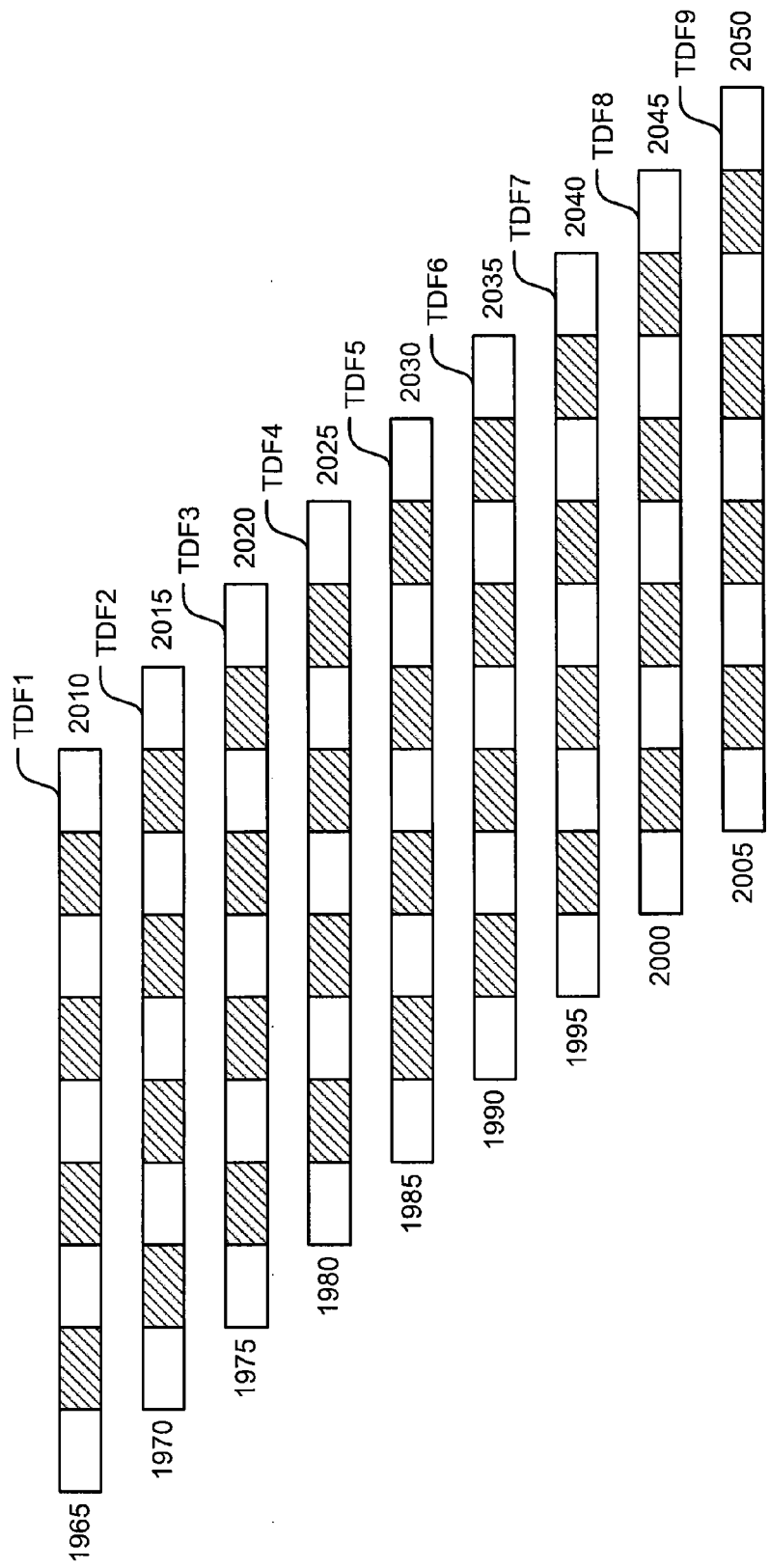
FIG. 1 is an illustration of a family of target date funds.

Unless defined otherwise, technical and financial terms used herein have the same meaning as commonly understood by one of ordinary skill in the art to which this invention belongs. For purposes of the present invention, the following terms are defined below.

Accumulation Phase: with respect to an investor in a target date fund, a period beginning on a start date, lasting a predetermined duration, and ending on a target date. During the accumulation phase, the investor occasionally (e.g., periodically) makes contributions into the target date fund, which are invested according to an accumulation phase investment strategy.

Asset Allocation: the apportionment of a fund into one or more asset classes.

Asset: a purchasable tangible or intangible item having economic value. Examples of assets include shares in a mutual fund, shares of a stock, bonds, and the like.

Asset Class: a group of securities that exhibit similar characteristics, behave similarly in the marketplace, and are subject to the same laws and regulations. The three main asset classes are equities (e.g., stocks), fixed-income (e.g., bonds), and cash equivalents (e.g., money market instruments). However, asset classes may include additional types of assets, such as real estate and commodities. Each asset class may reflect different risks, return, or investment characteristics. Further, different asset classes may perform differently in the same market environment.

Benchmark Portfolio Investment strategy: a plan that dictates the portion of a benchmark portfolio invested in each of a plurality of asset classes. The benchmark portfolio investment strategy may be static or may vary over time. The benchmark portfolio investment strategy includes a glide path, which is the percentage of the benchmark portfolio invested in equity assets (as opposed to non-equity assets) plotted over time.

Boundary Fund: a target date fund within a family of target date funds having either the earliest or the latest target date. If the family is missing a boundary fund, the missing boundary fund will have a target date that is either earlier than the earliest target date of a fund present in the family or a target date that is later than the latest target date of a fund present in the family.

Deccumulation Phase: with respect to an investor in a target date fund, a period beginning on a target date and ending when the investor has completely divested all his/her investments from the target date fund. During the deccumulation phase, the investor may make contributions into the target date fund, make withdrawals from the target date fund, and combinations thereof. The deccumulation phase may or may not have a predetermined duration. During the deccumulation phase, investment in the target date fund may be invested according to a deccumulation phase investment strategy.

Family of Target Date Funds: a plurality of target date funds offered by a fund provider, each target date fund being invested according to the same accumulation phase investment strategy and thus, having the same glide path for that phase. A family may also be referred to as a "suite" of target date funds.

Glide Path: a plot of the percentage of an accumulation phase investment strategy invested in equity assets (as opposed to non-equity assets) over the duration of the accumulation phase.

Target Date Fund Investment strategy: a time varying plan that dictates the portion of a target date fund invested in each of a plurality of asset classes. Within a family, each target date fund is invested according to the same target date fund investment strategy. Therefore, the target date fund investment strategy is associated with both the individual target date funds of a family as well as with the family. The target date fund investment strategy includes a glide path, which is the percentage of the fund invested in equity assets (as opposed to non-equity assets) plotted over the duration of the accumulation phase. Generally, as a target date fund approaches its target date, the target date fund investment strategy shifts the portion of the assets in the fund belonging to each of the plurality of asset classes towards a more conservative allocation between the classes. Therefore, the glide path portion of the target date fund investment strategy typically slopes downwardly from the beginning of the accumulation phase to the target date as the portion of the fund invested in equity assets decreases, although this is not a requirement. The target date fund investment strategy may include both an accumulation phase investment strategy that is used to determine the asset allocation of the fund during the accumulation phase and a deccumulation phase investment strategy that is used to determine the asset allocation of the fund during the deccumulation phase. Further, the target date fund investment strategy may specify in which assets or in what type of assets within each asset class a target date fund is invested.

Performance Universe: a group of similar funds used for performance comparisons. The performance universe may include the rates of return and other statistics for each fund over a set of evaluation periods (e.g., one month, three months, six months, one year, and two years).

Sandwiched Fund: a target date fund within a family of target date funds having a target date that is neither the earliest target date nor the latest target date. A sandwiched fund is flanked by a first fund within the family having a target date that is earlier than the target date of the sandwiched fund and a second fund within the family having a target date that is later than the target date of the sandwiched fund. If the family is missing a sandwiched fund, the missing sandwiched fund will have a target date that is between the target dates of two funds present in the family.

Target Date: the date on which the accumulation phase ends. The year of the target date is referred to herein as a target year.

Target Date Fund (also known as a Life Cycle Fund, an Age-Based Fund, and a Lifestyle Fund): A "managed" diversified investment fund that over time adjusts the portions of the assets in the fund belonging to a plurality of asset classes (e.g., stocks, bonds, cash equivalents, etc.) according to a target date fund investment strategy (which includes a glide path). A first portion of the target date fund investment strategy occurs during an accumulation phase and a second portion of the target date fund investment strategy occurs during a deccumulation phase. By adjusting the portion of the assets in the fund belonging to each of the plurality of asset classes, the target data fund attempts to maximize wealth generated by the fund at the end of the accumulation phase on a "target date." Generally, a target date fund shifts the portion of the assets in the fund belonging to each of the plurality of asset classes towards a more conservative mix as the fund approaches the target date. The managers of theses funds decide issues related to asset allocation, diversification, and rebalancing over the accumulation and deccumulation phases of the target date fund's investment strategy.

Figure 3:
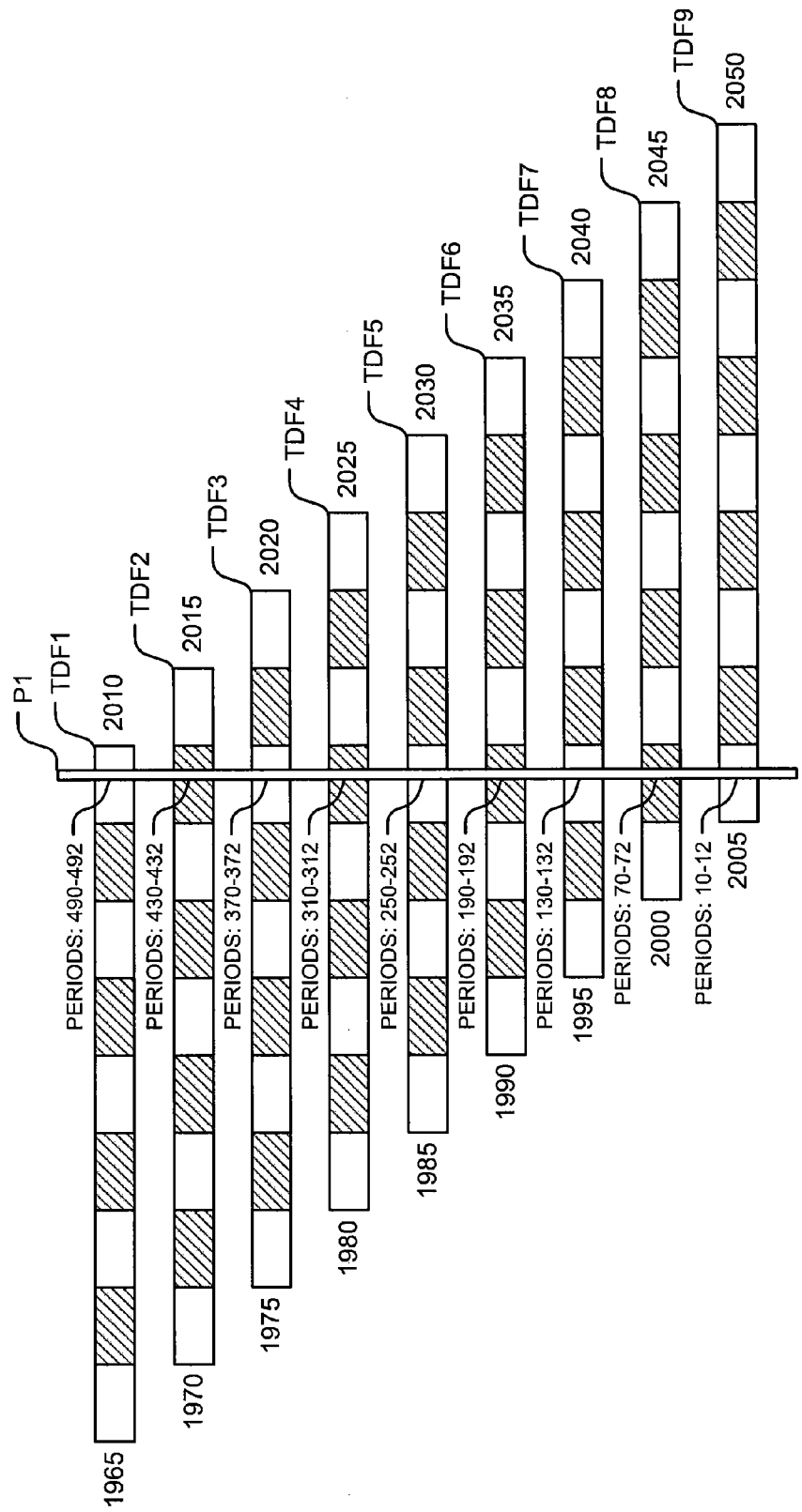
FIG. 3 is an illustration of the family of target date funds of FIG. 1 and the location of an evaluation period within the accumulation phase of each of the funds.

In FIG. 3, the Family "F1" of target date funds TDF1-TDF9 described above in the Background Section is reproduced for illustrative purposes. Because the accumulation phases of the target date funds TDF1-TDF9 have start dates that are offset by five years, starting with fund TDF1 and ending with fund TDF9, the funds are illustrated as being offset or staggered by five years. The accumulation phase of each of the funds TDF1-TDF9 depicted in FIG. 3 is assumed to be approximately 45 years.

A 45-year accumulation phase was chosen for illustrative purposes because few families of target date funds currently available include a fund having a target date beyond 2050. However, a 45-year accumulation phase is not a requirement.

Currently, families offered by fund providers include target date funds spaced apart by five-year or ten-year regular intervals. For example, Russell Investments of Tacoma, Wash. offers families of target date funds spaced apart by five-year intervals. However, in principle target date funds could be offered at larger or smaller intervals. Therefore, the five-year interval depicted in FIG. 3, was also selected based on current industry practice and is not intended to limit the scope of the present teachings.

If the accumulation phase is divided into periods, each period being one month in length, the accumulation phase of each of the funds TDF1-TDF9 has 540 periods. If the periods of the accumulation phase are numbered from the start of the accumulation phase to the end of the accumulation phase (i.e., the target date), the accumulation phase includes periods 1 to 540. For ease of illustration, within the accumulation phase of each of the target date funds TDF1-TDF9, every other block of 60 periods (five years) is shaded. While in the examples presented a period corresponds to one month, this is not a requirement. By way of another non-limiting example, a period could be one day, one quarter, one year, or any other duration.

Aspects of the present invention relate to the observation that for a given time period (e.g., three months), the asset allocation within each target date fund in the Family "F1" corresponds to a different portion of the accumulation phase investment strategy. For example, 40 years before the target date, the asset allocations within the fund TDF8 (which has a target date of 2045) will be substantially similar or identical to asset allocations of the fund TDF9 fund (which has a target date of 2050) 40 year before its target date. Further, the asset allocations for the fund TDF9 in 2010 will be the same as or substantially similar to the allocations were for the fund TDF8 in 2005. At any particular period of time, both funds, TDF8 and TDF9, are simply invested according to a different portion of the same target date fund investment strategy. In other words, in 20 years, the fund TDF7 will be invested according to the same or substantially similar asset allocation in which the fund TDF3 is presently invested.

Each month, each of the target date funds TDF1-TDF9 may have a realized rate of return. Each of these realized rates of return is an observation of a rate of return that may be realized by any of the other target date funds when the assets of those funds are allocated in the same manner. This occurs when the target date funds are allocated according to the same portion of the target date fund investment strategy. For example, December 2006 is the $492^{nd}$ period (i.e., 540−48=492) of the fund TDF1. The realized rate of return of the fund TDF1 for its $492^{nd}$ period (December 2006) can be thought of as an observation of realized rate of return for the $492^{nd}$ period for the entire Family "F1" of target date funds. Similarly, December 2006 is the $432^{nd}$ period of the TDF2 fund. The realized rate of return of the fund TDF2 for its $432^{nd}$ period (December 2006) can be thought of as an observation of realized rate of return for the $432^{nd}$ period for the entire Family "F1" of target date funds. In this way, each period (e.g., month) provides nine observations of rates of return located at different points in the target date fund investment strategy and at different points along the glide path.

Turning to FIG. 3, if the vertical bar "P1" represents an evaluation period of about one quarter of a year (i.e., three months), the bar "P1" is three periods wide. As shown in FIG. 3, the bar "P1" overlaps different periods of each of the target date funds. Therefore, different periods of the funds TDF1-TDF9 occur during the evaluation period. Table 2 below lists the periods overlapped by bar "P1."

TABLE 2

| TARGET DATE FUND | PERIODS OVERLAPPED BY BAR "P1" |
| --- | --- |
| Fund TDF1 | 490-492 |
| Fund TDF2 | 430-432 |
| Fund TDF3 | 370-372 |
| Fund TDF4 | 310-312 |
| Fund TDF5 | 250-252 |
| Fund TDF6 | 190-192 |
| Fund TDF7 | 130-132 |
| Fund TDF8 | 70-72 |
| Fund TDF9 | 10-12 |

Figure 2:
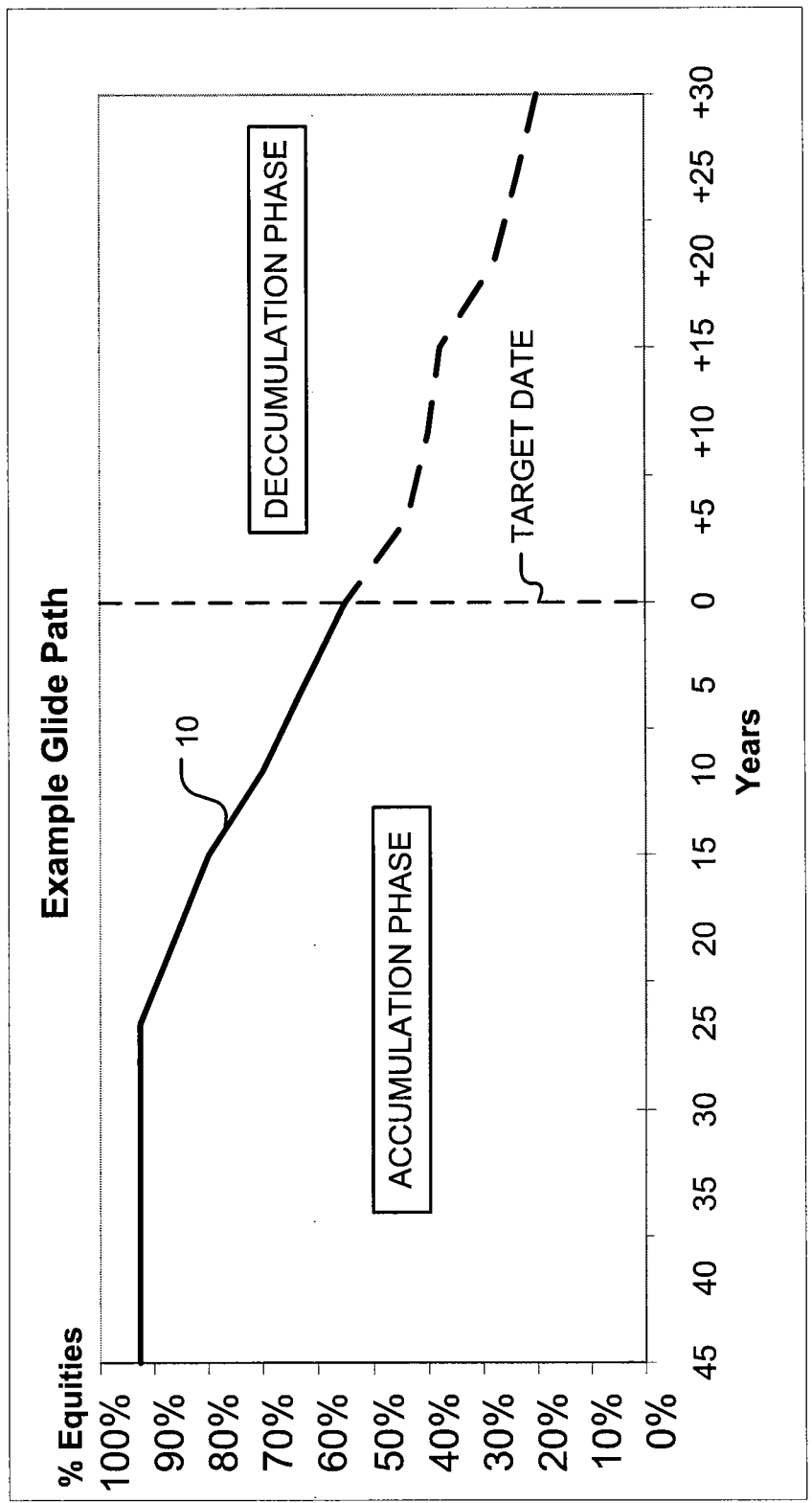
FIG. 2 is an illustration of an exemplary conventional glide path of the family of target date funds depicted in FIG. 1.
Figure 4:
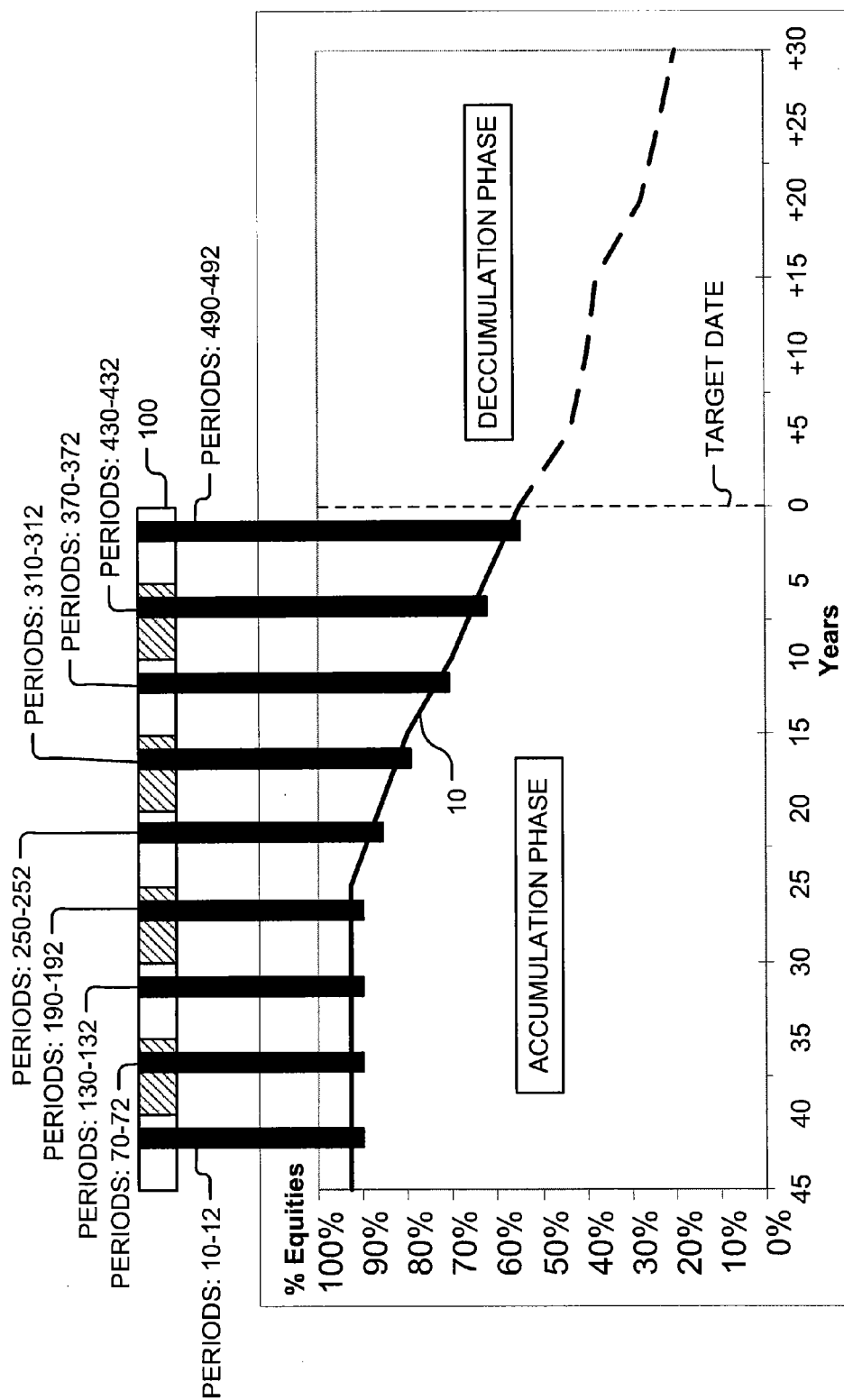
FIG. 4 is an illustration of a model of the family of target date funds of FIG. 1 positioned above the glide path of FIG. 2.

Referring to FIG. 4, a model 100 of the Family "F1" of target date funds TDF1-TDF9 is provided. The model 100 has the same duration (45 years) as each of the target date funds TDF1-TDF9 of the Family "F1." Below the model 100, in FIG. 4, the exemplary glide path 10 of FIG. 2 has been reproduced for illustrative purposes. Like each of the target date funds TDF1-TDF9, the model 100 has 540 periods. For ease of illustration, every other block of 60 periods of the model 100 has been shaded.

The black vertical bars in FIG. 4 extending from the model 100 and intersecting with the glide path 10 each correspond to the periods of Table 2 (i.e., the periods where bar "P1" overlaps the target date funds TDF1-TDF9). In other words, each of the black bars corresponds to a portion of the periods of the target date funds TDF1-TDF9 and illustrates where that portion is located on the exemplary glide path 10. Clearly, the asset allocation of the fund TDF1 for the three months illustrated by bar "P1" differs from the asset allocation of the fund TDF9 during those same three months.

If the realized rate of return is known for each of the target date funds TDF1-TDF9 during the evaluation period (i.e., the three months illustrated by bar "P1" and listed in Table 2), those values may be inserted into the model 100. Specifically, the realized rates of return of the target date funds TDF1-TDF9 for the periods of overlap with bar "P1" may be inserted into the model 100 at the locations identified by the vertical black bars. More specifically, the realized rates of return of fund TDF1 for periods 490-492, may be inserted into periods 490-492, respectively, of the model 100; the realized rates of return of fund TDF2 for periods 430-432, may be inserted into periods 430-432, respectively, of the model 100; the realized rates of return of fund TDF3 for periods 370-372, may be inserted into periods 370-372, respectively of the model 100; and so forth. Table 3 below provides a mapping of the periods of the model 100 and corresponding periods of the target date funds TDF1-TDF9. The realized rates of return for periods of the target date funds TDF1-TDF9 listed are assigned to the corresponding periods of the model 100 identified.

TABLE 3

| PERIODS OF THE MODEL 100 | REALIZED RATES OF RETURN TARGET DATE FUND AND PERIODS | |
| --- | --- | --- |
| 490-492 | Fund TDF1 | 490-492 |
| 430-432 | Fund TDF2 | 430-432 |
| 370-372 | Fund TDF3 | 370-372 |
| 310-312 | Fund TDF4 | 310-312 |
| 250-252 | Fund TDF5 | 250-252 |
| 190-192 | Fund TDF6 | 190-192 |
| 130-132 | Fund TDF7 | 130-132 |
| 70-72 | Fund TDF8 | 70-72 |
| 10-12 | Fund TDF9 | 10-12 |

While the target date funds TDF1-TDF9 of the Family "F1" are offset from one another by a uniform interval (e.g., five years), this is not a requirement. Instead, the target date funds TDF1-TDF9 may be offset from one another by two or more differing time periods. Further, one or more of the target date funds TDF1-TDF9 may be omitted entirely from the Family "F1."

Figure 5:
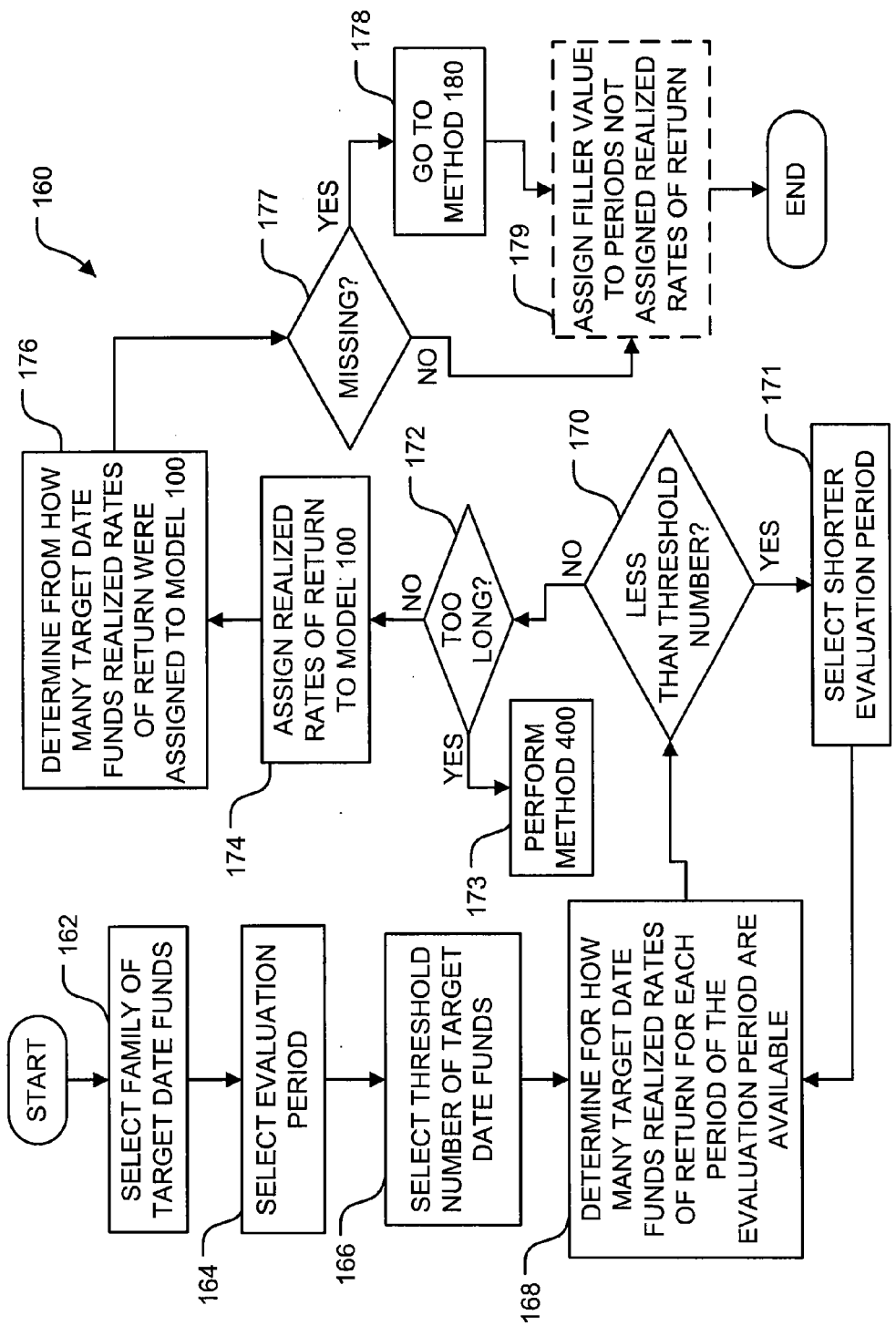
FIG. 5 is a flow diagram of a method of constructing the model of FIG. 4.

Referring to FIG. 5, for any family of target date funds, a method 160 may be used to construct the model 100. In first block 162, a family of the target date funds is selected. Then, in block 164, an evaluation period is selected. Then, in block 166, a threshold number of target date funds is selected. By way of an example, four may be selected as the threshold number.

It may be desirable to have a realized rate of return for each period of the evaluation period for at least the threshold number of target date funds. For example, if a two-year evaluation period is selected, it may be desirable to have realized rates of return for the 24 periods within the two-year evaluation period for at least four of the target date funds. Similarly, if a five-year evaluation period is selected, it may be desirable to have realized rates of return for the 60 periods within the two-year evaluation period for at least four of the target date funds. When making the determination in block 168, the target date fund having the most distant target date (e.g., fund TDF9, which has a target date of 2050) may be omitted. In block 168, the method 160 determines for how many target date funds realized rates of return for each period of the evaluation period are available.

In decision block 170, whether the realized rates of return are available for each period of the evaluation period for less than the threshold number of target date funds is decided. If the decision in block 170 is "YES," then realized rates of return are not available for each period of the evaluation period for at least the threshold number of target date funds. Otherwise, realized rates of return are available for each period of the evaluation period for at least the threshold number of target date funds and the decision in block 170 is "NO."

If the decision in block 170 is "YES," in block 171, a new shorter evaluation period is selected and the method returns to block 168. If the decision in block 170 is "NO," in decision block 172, whether the evaluation period is greater than the shortest interval between two successive target date funds in the family is determined. If the evaluation period is equal to or shorter than the shortest interval between two successive target date funds in the family the decision in decision block 172 is "NO." Therefore, with respect to Family "F1," if the evaluation period is five years or less, the decision in decision block 172 is "NO." On the other hand, if the evaluation period is greater than the shortest interval between two successive target date funds in the family the decision in decision block 172 is "YES." Therefore, with respect to Family "F1," if the length of the evaluation period is equal to or greater than 61 periods, the decision in decision block 172 is "YES."

Figure 10:
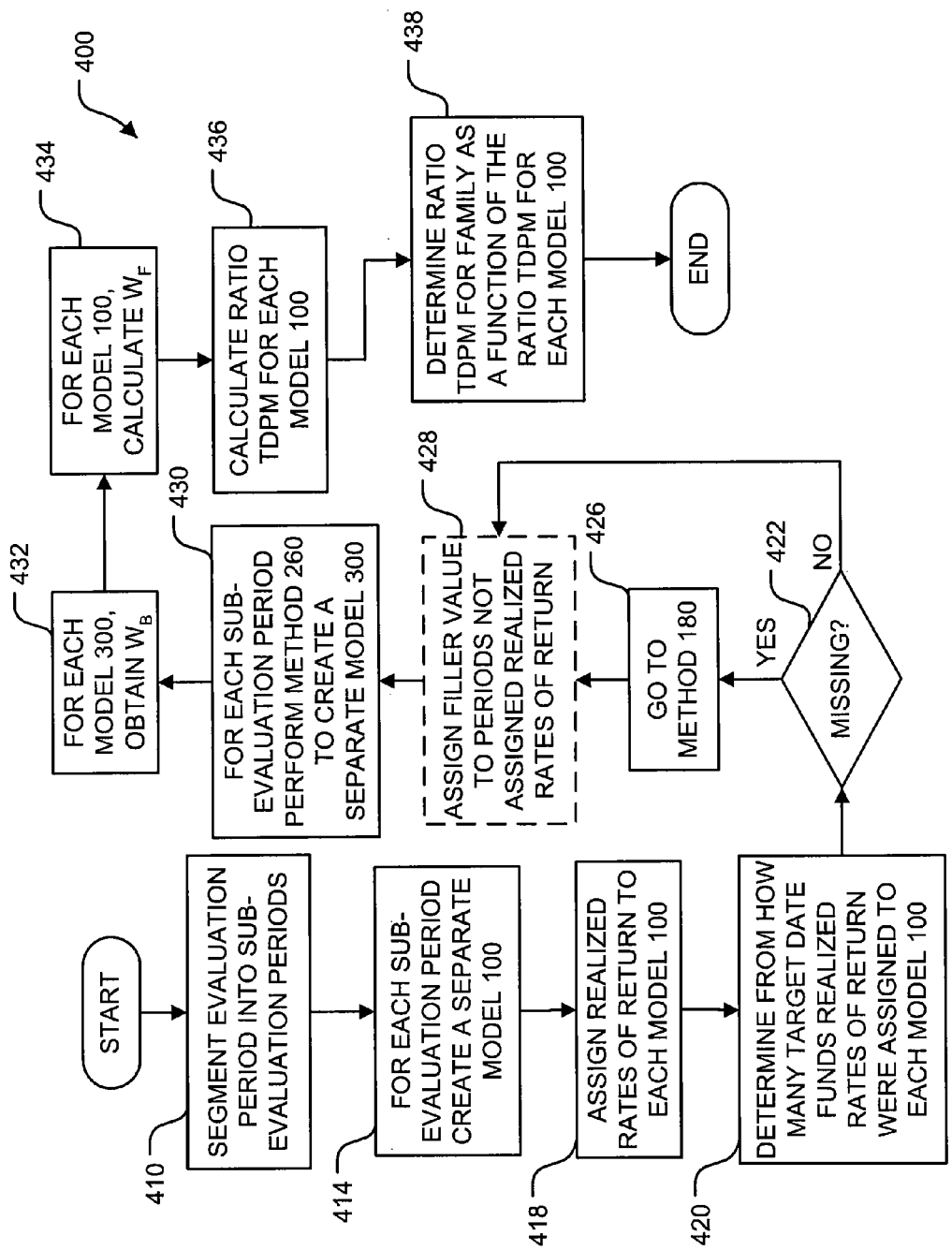
FIG. 10 is a flow diagram of a method of determining a ratio "TDPM" for a family of target date funds using an evaluation period that is greater than the shortest interval between two successive target date funds in the family.

If the decision in decision block 172 is "YES," in block 173, a method 400 depicted in FIG. 10 is performed. Otherwise, if the decision in decision block 172 is "NO," in block 174, the realized rates of return are assigned to appropriate periods in the model 100. Even if the target date fund having the most distant target date was omitted in block 168, that target date fund may be included in block 174. At this point, the model 100 will include realized rates of return for at least the threshold number of target date funds in the family.

In block 176, from how many target date funds realized rates of return were assigned to the model 100 is determined. In other words, in block 176, from how many target date funds realized rates of return for each period of the evaluation period are available is determined. The result of block 176 may differ from that of block 168 if block 168 omitted the target date fund having the most distant target date (e.g., fund TDF9). However, if block 168 did not omit the target date fund having the most distant target, block 176 may be skipped.

In decision block 177, whether a target date fund is missing is determined. A target date fund is "missing" if one of two conditions is met. First, a target date fund is "missing" if realized rates of return were not available for that fund for each period of the evaluation period. Therefore, the first condition is met if block 176 determines the number of target date funds from which realized rates of return were assigned to the model 100 is less than the total number of target date funds in the family. Second, a target date fund may be considered "missing" if the family is presumed to include a predetermined number of target date funds (e.g., nine) and the family actually includes fewer target date funds than that predetermined number.

If the family is presumed to include target date funds spaced apart by a regular interval (e.g., five years, ten years, and the like), the missing target date fund(s) may belong in one or more gaps larger than the intervals that are located between successive target date funds. If no such gaps exist, the "missing" target date fund(s) may have a target date that is earlier than the earliest target date of the target date funds of the family and/or the "missing" target date fund(s) may have a target date that is later than the latest target date of the target date funds of the family. By way of a non-limiting example, if the target date funds within the family are spaced apart by a regular ten-year interval, target date funds that would have existed between, before, or after these funds if the funds were instead spaced apart by regular five-year intervals may be considered missing in block 177.

If a target date fund is missing, the decision in block 177 is "YES," and in block 178, the method 180 (see FIG. 6) is performed. After the method 180 has completed, the method 160 may advance to optional block 179. If the decision block 177 determines no target date funds are missing, the decision is "NO," and the method 160 may advance to optional block 179. If optional block 179 is omitted, the method 160 terminates.

In optional block 179, any periods of the model 100 to which a realized rate of return has not been assigned may be assigned a filler value to provide a complete model of the Family "F1" of target date funds. If all of the periods of the model 100 were assigned realized rates of return in block 174 and/or block 178, the optional block 179 may be omitted.

By assigning the filler value to periods for which realized rates of return have not been assigned and may not be available, an estimate of the performance of the Family "F1" may be determined without waiting until the target date (e.g., 45 years from the start of the accumulation phase) to obtain the "true" rates of return for a particular target date fund. After block 179, the method 160 terminates.

With respect to determining a filler value, an expected value of the realized rate of return of the family of target date funds may not be a practical choice because calculating that value would require detailed knowledge of each fund provider's investment strategy, which as explained above is not publicly available. Therefore, a benchmark fund or group of benchmark funds (the "benchmark portfolio") may be selected. As mentioned in the Background Section, while other benchmark portfolios created according to selected glide paths have been proposed, none of these portfolios has gained widespread use.

The filler value may be determined as a function of the realized rate of return of the benchmark portfolio. The filler value may be a constant value; however, this is not a requirement. By way of non-limiting example, the filler value may be an expected value (i.e., an expected realized rate of return) of the benchmark portfolio. As is apparent to those of ordinary skill in the art, the selection of the benchmark portfolio and determination of the filler value may be somewhat arbitrary.

Like each of the target date funds TDF1-TDF9, the benchmark portfolio includes a plurality of assets. Those assets may belong to one or more asset classes. The asset allocation within the benchmark portfolio may be varied over the duration of the accumulation phase of the model 100 according to a benchmark portfolio investment strategy.

By way of a non-limiting example, the benchmark portfolio investment strategy may include an evolving composite of market indexes. Further, the benchmark portfolio investment strategy may include the specific asset allocation of the benchmark portfolio for each period of the accumulation phase so that the expected return of the benchmark portfolio can be easily calculated for each period of the accumulation phase.

For example, the benchmark portfolio could be allocated based on a "35+ years left to target fund maturity" formula. Using this formula, the amount of the fund allocated in equity is determined by adding 35 to the number of years from the present date until the target date and dividing the sum by 100. This formula provides a proxy for the equity allocation and is a "periodically changing" benchmark. Using this formula, a plot of the equity allocation of the benchmark portfolio over the accumulation phase would slope downwardly from "(35+45)/100" (80% equity) at start of a fund to "(35+0)/100" (35% equity) at the end of the accumulation phase. This means that in year 2007, the fund TDF1 (having a target date in 2010) was allocated "(35+3)/100" (or 38%) in equity. The fund TDF9 (having a target date in 2050) was allocated "(35+43)/100" (or 78%) in equity.

Alternatively, the asset allocation of the benchmark portfolio may remain constant over the accumulation phase. For example, the asset allocation may include 60% equities and 40% bonds. By way of a non-limiting example, the benchmark portfolio may be allocated 40% in the Russell 3000 Index, 20% in the MSCI EAFE Index, and 40% in the Lehman Bond Aggregate Index. By way of another example, the benchmark portfolio could include alternate asset allocations using similar or alternate asset classes. For example, the benchmark portfolio may be allocated 30% in the S&P 500 Index, 10% in the Dow Jones-AIG Commodity Index, 20% in the MSCI EAFE Index, and 40% in the Lehman Bond Aggregate Index.

The filler value may be an expected value determined using forecasts of the expected return of the benchmark portfolio. The forecasts used may be for a predetermined period of time, such as 10 years, 20 years, 30 years, and the like. The annualized expected rate of return of the Russell 3000 Index is about 8.7%, the annualized expected rate of return of the MSCI EAFE Index is about 8.7%, and the annualized expected rate of return of the Lehman Bond Aggregate is about 6%. If the benchmark portfolio is allocated 40% in the Russell 3000 Index, 20% in the MSCI EAFE Index, and 40% in the Lehman Bond Aggregate Index, the expected value determined using 20-year forecasts of the expected return of the benchmark portfolio yields a constant filler value (i.e., filler rate of return) of about 0.635% per month (i.e., (40%*8.7%+20%*8.7%+40%*6%)/12=0.635% per month). As is apparent to those of ordinary skill in the art, this value may change over time as new data is used calculate the forecast of the expected return of the benchmark portfolio. In this example, the Russell Investments 20-year forecast is used but this is not a requirement and any suitable source may be used. This filler value may be assigned to any periods of the model 100 to which a realized rate of return has not been assigned.

As is apparent to those of ordinary skill in the art, an unlimited number of examples of constant or varying benchmark portfolios and benchmark portfolio investment strategies could be created using different asset allocations and different asset classes. These asset classes could vary from equities to bonds to commodities to real estate to any other asset class. Further, the source of the forecast used to determine the expected value of the rate of return of the benchmark portfolio may include any suitable source known in the art.

While in the above example, it was assumed the model 100 includes only rates of return realized during the accumulation phases of the funds TDF1-TDF9, this is not a requirement. A target date fund having a target date of 2005 is considered to be beyond its target date. However, many investors may remain invested in the fund after the target date. Therefore, the model 100 may be extended to include additional periods beyond the target date. Rates of return realized by funds beyond their target date may be assigned to these additional periods.

Figure 6:
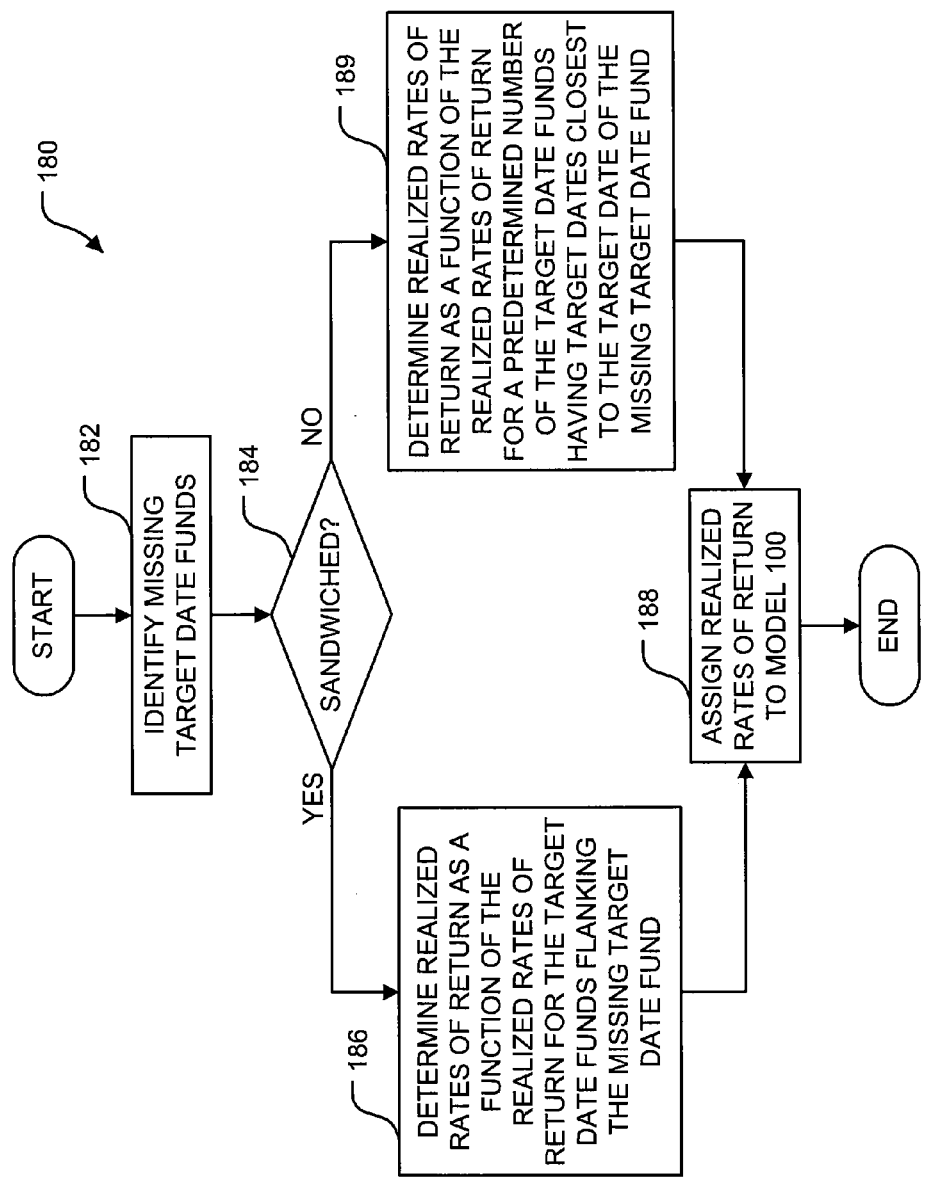
FIG. 6 is a flow diagram of a method for determining realized rates of return for a target date fund missing from the model of FIG. 4.

Turning now to FIG. 6, the method 180 will be described. At the start of the method 180, the model 100 has been assigned realized rates of return from fewer than the total number of target date funds in the family or the family is "missing" a target date fund. In first block 182, the missing target date funds are identified. Then, for each missing target date fund, decision block 184 determines whether the target date fund is sandwiched between two target date funds for which realized rates of return for the periods of the evaluation period were available. For example, assume realized rates of return were available for funds TDF1 and TDF3 but not for fund TDF2. In this case, the fund TDF2 is sandwiched between two target date funds, TDF1 and TDF3, for which realized rates of return were available. Therefore, with respect to decision block 184, the decision for TDF2 would be "YES."

On the other hand, if realized rates of return were not available for fund TDF9 but were available for fund TDF8, the fund TDF9 is not sandwiched between two target date funds for which realized rates of return were available. Therefore, with respect to decision block 184, the decision for fund TDF9 would be "NO." The fund TDF9 is referred to as a missing boundary target date fund.

If the decision in decision block 184 is "YES," in block 186, the realized rates of return for the missing sandwiched target date fund are determined as a function of the realized rates of return for the target date funds flanking the missing target date fund. For example, if fund TDF2 is missing, its realized rates of return are determined as a function of the realized rates of return for funds TDF1 and TDF3. For each period of the evaluation period, the realized rate of return for the sandwiched missing target date fund may be calculated by averaging the realized rates of return of target date funds on either side of the missing target date fund for that same period. For example, the realized rate of return for July 2006 for the missing fund TDF2 may be the average of the realized rates of return for the funds TDF1 and TDF3 for July 2006.

Then, in block 188, the realized rate(s) of return for the missing target date fund for the evaluation period are assigned to the model 100 in the appropriate period(s) and the method 180 terminates.

If the decision in decision block 184 is "NO," in block 189, the missing target date fund is a boundary fund. A boundary fund is not flanked on both sides by a pair of target date funds. The realized rates of return for the missing boundary target date fund are determined as a function of the realized rates of return for a predetermined number of the target date funds having the closest target dates to the target date of the missing boundary target date fund. By way of a non-limiting example, the predetermined number may be two. For example, if fund TDF9 is missing, its realized rates of return are determined as a function of the realized rates of return for funds TDF7 and TDF8. For each period of the evaluation period, the realized rate of return for the missing boundary target date fund may be calculated by extrapolating (e.g., linearly) the realized rates of return for that same period for the predetermined number of the target date funds having the closest target dates to the target date of the missing boundary fund. For example, the realized rate of return for July 2006 for the missing fund TDF9 may be the linearly extrapolated value of the realized rates of return for the funds TDF8 and TDF7 for July 2006.

Then, in block 188, the realized rate(s) of return for the missing target date fund(s) for the evaluation period are assigned to the model 100 in the appropriate period(s) and the method 180 terminates.

The model 100 can be revised or updated as additional realized rates of return become available. In other words, if realized rates of return for the target date funds TDF1-TDF9 become available for one or more additional periods, those rates of return can be inserted into the model 100 at the appropriate locations. For example, at the end of the current month, realized rates of return for the target date funds TDF1-TDF9 will be available. The evaluation period may be expanded by one month to include the current month and the model 100 updated by assigning the realized rates of return for the target date funds TDF1-TDF9 for the current month to the appropriate periods of the model 100.

Figure 7:
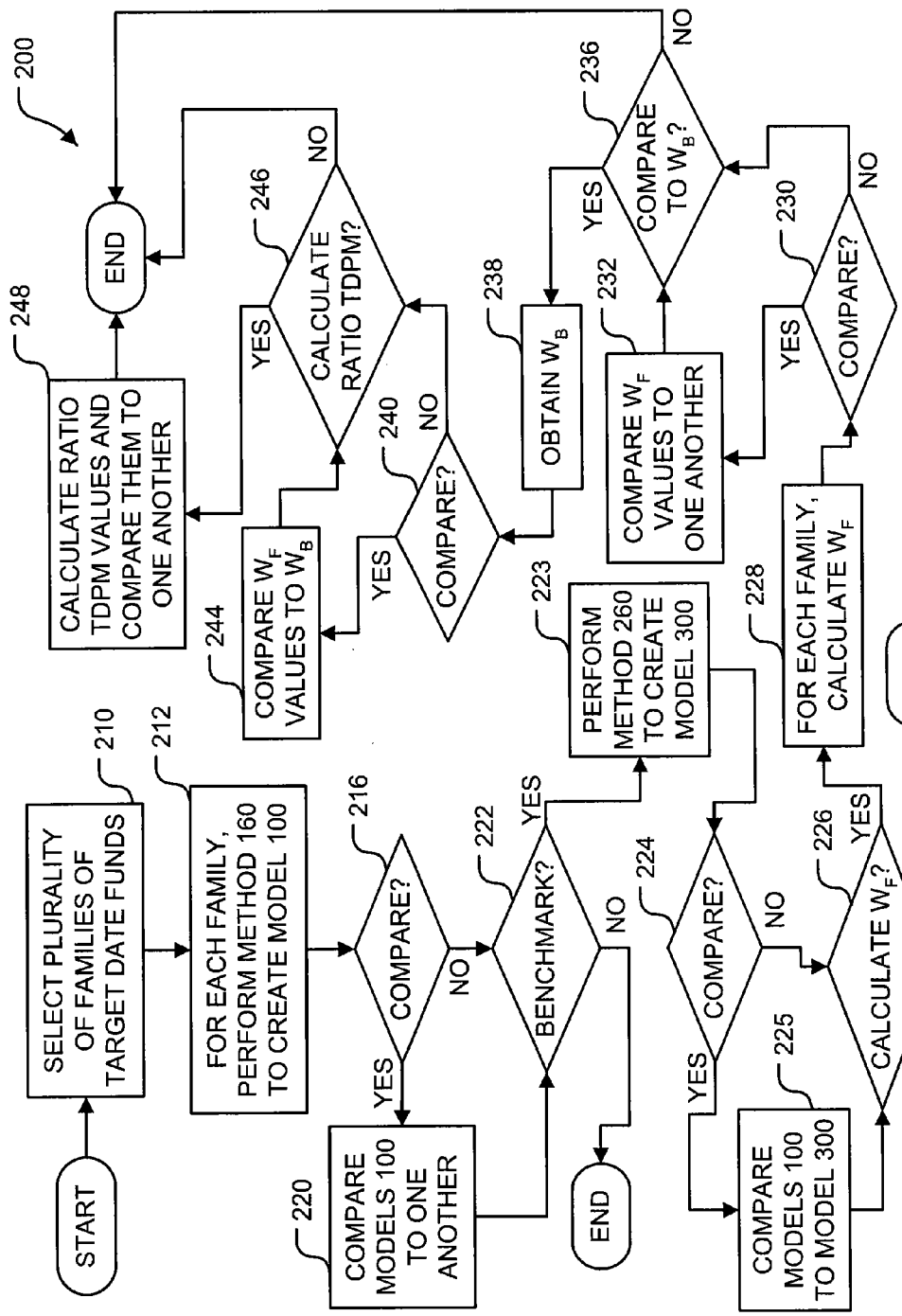
FIG. 7 is a flow diagram of a method of using a plurality of models of families of target date funds to evaluate the propensity of each to generate wealth at the target date.

Referring to FIG. 7, a method 200 of comparing the propensity of a plurality of families of target date funds to generate wealth is provided. In block 210, a plurality of families of target date funds is selected. For illustrative purposes it is assumed the following families were selected in block 210: Family "F1;" Family "F2;" Family "F3;" Family "F4;" Family "F5;" Family "F6;" and Family "F7." Each of the families "F2"-"F7" is substantially similar to the Family "F1" but is invested according to a different target date fund investment strategy.

The model 100 may be considered a wealth generation performance measure corresponding to the propensity of the family of target date funds to generate wealth over the accumulation phase. As mentioned previously, the model 100 may also provide a wealth generation performance measure corresponding to the propensity of the family of target date funds to generate wealth over at least a portion of the deccumulation phase.

In block 212, a separate model 100 is generated for each of the plurality of families "F1"-"F7" using the method 160 (see FIG. 5). In other words, the method 160 is repeated for each family "F2"-"F7" to create a plurality of models 100.

In decision block 216, a decision is made whether to compare the models 100 to one another. If the decision in block 216 is "YES," in block 220, the models 100 are compared to one another to determine which family has a greater propensity to generate wealth over the accumulation phase. Then, in decision block 222, a decision is made whether to compare the models 100 with a benchmark measure of performance. If the decision in block 216 is "NO," the method 200 advances to block decision 222.

Figure 8:
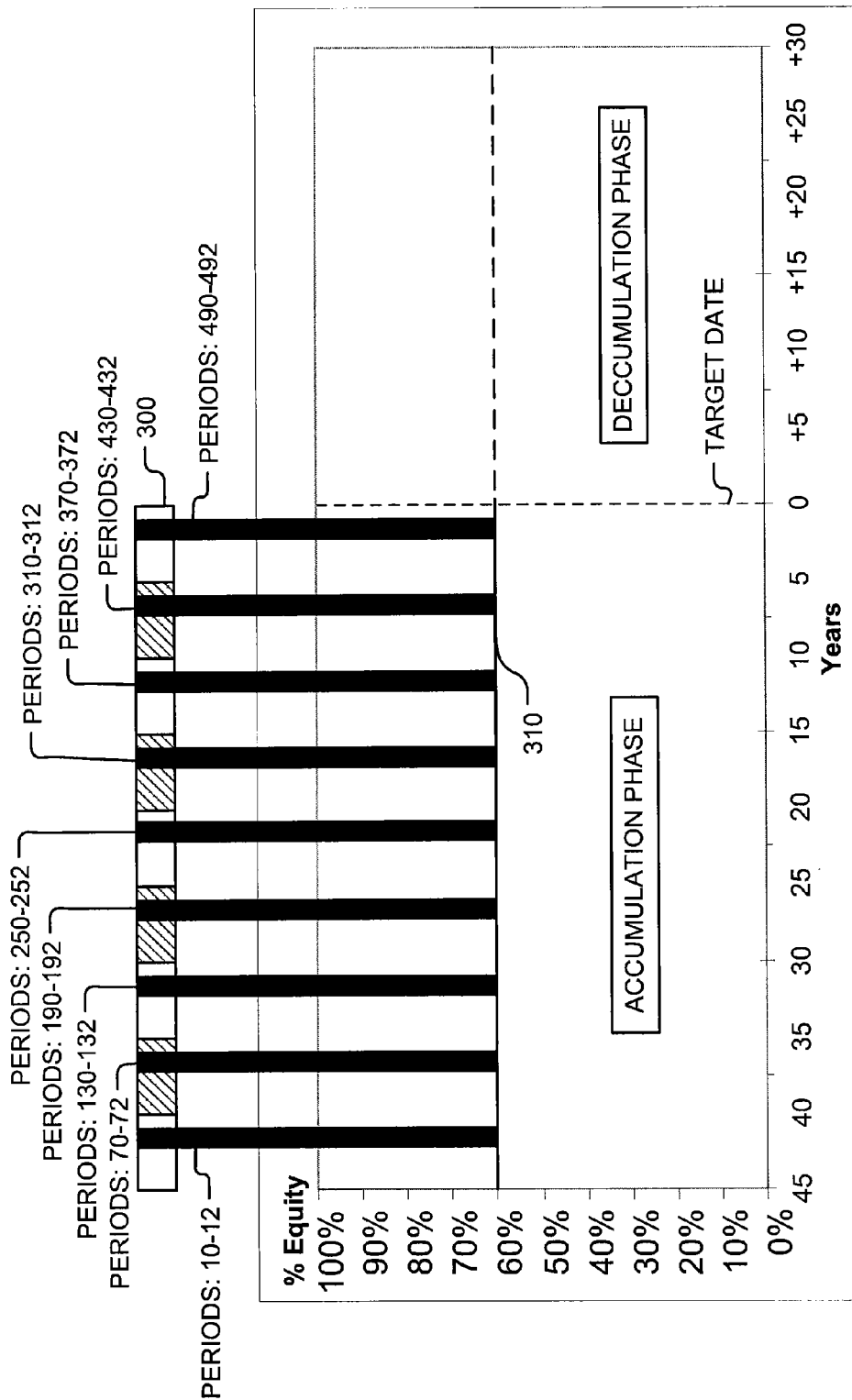
FIG. 8 is an illustration of a model of a benchmark portfolio positioned above an exemplary benchmark glide path.

If the decision in block 222 is "YES," in block 223, a method 260 (see FIG. 9) is performed to create a model 300 (see FIG. 8). If the decision in block 222 is "NO," the method 200 terminates.

FIG. 8 provides an illustration of the model 300. The model 300 has the same number of periods as the model 100. Thus, for illustrative purposes, the model 300 is assumed to include 540 periods. However, if the model 100 includes one or more periods of the deccumulation phase, the model 300 may include more than 540 periods. For ease of illustration, every other block of 60 periods (i.e., five years) of the model 100 has been shaded.

Figure 9:
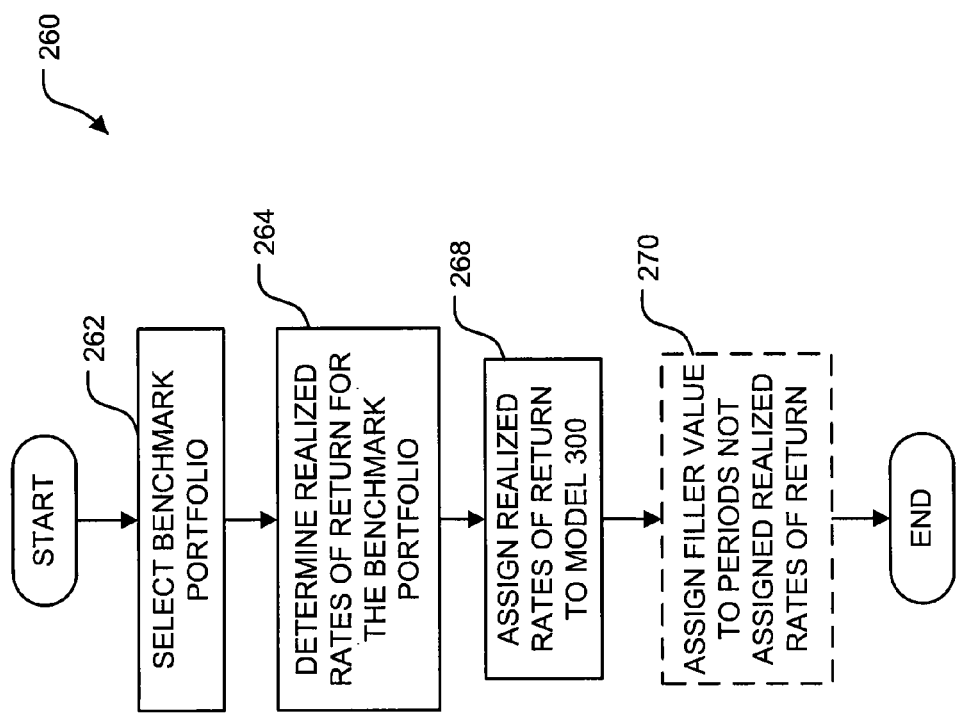
FIG. 9 is a flow diagram of a method of constructing the model of FIG. 8.

Turning to FIG. 9, the method 260 used to construct the model 300 will be described. In first block 262, a benchmark portfolio is selected. The benchmark portfolio selected may be the same benchmark portfolio used to determine the filler value in block 179 of method 160, depicted in FIG. 5 and described above. However, this is not a requirement and a different benchmark portfolio may be selected. Any benchmark portfolio discussed above as suitable for determining the filler value may be selected in block 262. In FIG. 8, it is assumed the benchmark portfolio investment strategy of the benchmark portfolio includes a constant asset allocation. Therefore, the glide path is constant. For illustrative purposes, a plot of an example glide path 310 has been provided below the illustration of the model 300. The glide path 310 has a constant equity allocation of approximately 60%.

The black vertical bars extending from the model 300 and intersecting with the glide path 310 each correspond to the periods of Table 2 (i.e., the periods where bar "P1" overlaps the target date funds TDF1-TDF9). In other words, each of the black bars corresponds to a portion of the periods of the target date funds TDF1-TDF9 and illustrates where that portion is located on the exemplary glide path 310.

In block 264, realized rates of return for each period of the evaluation period are determined for the benchmark portfolio. Just as a realized rate of return may be determined for each target date fund of the Family "F1" for each completed period yielding nine observations for Family "F1," at the end of a period, nine benchmark rates of return may be determined. These nine benchmark rates of return can be viewed as nine observations of the rates of return generated by a benchmark portfolio investment strategy, which includes the benchmark glide path.

For any periods within the evaluation period (i.e., the width of bar "P1"), a realized rate of return for the benchmark portfolio is determined. For example, if the evaluation period is a three-month period including October 2007, November 2007, and December 2007, the benchmark realized rates of return would be the rates of return of the benchmark portfolio in these months. Then, in block 268, these realized rates of return are assigned to the periods of the model 300 corresponding to periods of the model 100 to which realized rates of return have been assigned. Specifically, the realized rates of return for the benchmark portfolio during the evaluation period are assigned to the periods of the model 300 listed in Table 4 (below) and identified by the black vertical bars.

TABLE 4

| PERIODS OF THE MODEL 300 TO WHICH REALIZED RATES OF RETURN ARE ASSIGNED |
| --- |
| 490-492 |
| 430-432 |
| 370-372 |
| 310-312 |
| 250-252 |
| 190-192 |
| 130-132 |
| 70-72 |
| 10-12 |

In this manner, both the model 100 and the model 300 have realized rates of return assigned to the same periods. In optional block 270, any periods of the model 300 to which a realized rate of return has not been assigned may be assigned a filler value to complete the model. The same filler value used to complete the model 100 may also be used in block 270. The models 100 and 300 (with or without the filler values) may be compared to determine whether each of the families "F1"-"F7" of target date funds has outperformed the benchmark portfolio. Table 5 below provides a side-by-side mapping of the values assigned to each period in one of the models 100 to the values assigned to each period in the model 300.

TABLE 5

| Periods | Model 100 (Family of Target Date Funds) Values Assigned | Model 300 (Benchmark Portfolio) Values Assigned |
| --- | --- | --- |
| 540-493 | Filler value | Filler value |
| 492-490 | Realized Rates of Return for periods 492-490 of fund TDF1 | Realized Rates of Return for periods within evaluation period of Benchmark Portfolio |
| 489-433 | Filler value | Filler value |
| 432-430 | Realized Rates of Return for periods 432-430 of fund TDF2 | Realized Rates of Return for periods within evaluation period of Benchmark Portfolio |
| 429-373 | Filler value | Filler value |
| 372-370 | Realized Rates of Return for periods 372-370 of fund TDF3 | Realized Rates of Return for periods within evaluation period of Benchmark Portfolio |
| 369-313 | Filler value | Filler value |
| 312-310 | Realized Rates of Return for periods 312-310 of fund TDF4 | Realized Rates of Return for periods within evaluation period of Benchmark Portfolio |
| 309-253 | Filler value | Filler value |
| 252-250 | Realized Rates of Return for periods 252-250 of fund TDF5 | Realized Rates of Return for periods within evaluation period of Benchmark Portfolio |
| 249-193 | Filler value | Filler value |
| 192-190 | Realized Rates of Return for periods 192-190 of fund TDF6 | Realized Rates of Return for periods within evaluation period of Benchmark Portfolio |
| 189-133 | Filler value | Filler value |
| 132-130 | Realized Rates of Return for periods 132-130 of fund TDF7 | Realized Rates of Return for periods within evaluation period of Benchmark Portfolio |
| 129-73 | Filler value | Filler value |

TABLE 5-continued

| Periods | Model 100 (Family of Target Date Funds) Values Assigned | Model 300 (Benchmark Portfolio) Values Assigned |
| --- | --- | --- |
| 72-70 | Realized Rates of Return for periods 72-70 of fund TDF8 | Realized Rates of Return for periods within evaluation period of Benchmark Portfolio |
| 69-13 | Filler value | Filler value |
| 12-10 | Realized Rates of Return for periods 12-10 of fund TDF9 | Realized Rates of Return for periods within evaluation period of Benchmark Portfolio |
| 9-1 | Filler value | Filler value |

After optional block 270, the method 260 terminates. If the optional block 270 is omitted from the method 260, the method terminates after the block 268.

Returning to the method 200 of FIG. 7, after the model 300 is created in block 223, in decision block 224, a decision is made whether to compare the models 100 to the model 300. If the decision in block 224 is "YES," in block 225, the models 100 are compared to the model 300 to determine the propensity of the models 100 to generate wealth relative to the propensity of the model 300 to generate wealth. Then, in decision block 226, a decision is made whether to calculate an estimate "$W_F$" of the wealth generated by the families "F1"-"F7" of target date funds. If the decision in block 224 is "NO," the method 200 advances to decision block 226.

If the decision in block 226 is "NO," the method 200 terminates. On the other hand, if the decision in block 226 is "YES," in decision block 228, for each family "F1"-"F7," an estimate "$W_F$" of the wealth generated by the family is determined. As mentioned above, for illustrative purposes, it is assumed that the duration of the accumulation phase of the target date funds TDF1-TDF9 is divided into 540 periods. It is further assumed that a rate of return "$r_t$" (realized or filler) has been assigned to each period "t." The value of the subscript "t" indicates to which period the rate of return has been assigned. It is also assumed that an investor has made a contribution "$C_t$" in each of the periods "t." The value of the subscript "t" indicates in which period the contribution was made. With respect to any of the periods, the contribution may be equal to zero, indicating no contribution was made for that period.

Presently, no industry standard contribution pattern has been established. While conventional wisdom as well as empirical evidence suggest that contributions made by defined contribution participants increase closer to the target date, estimates of the growth in contribution vary. Also, with target date funds being seen as the leading candidate default investment option, historical patterns may not hold up as the market evolves. For the sake of simplicity, when calculating the estimate "$W_F$," it has been assumed that each of the contributions $C_1$-$C_{540}$ is one dollar. Thus, one dollar is deposited at the beginning of each of the 540 periods.

Using this information, the estimate "$W_F$" of the wealth generated by the each of the families "F1"-"F7" may be calculated according to the following formula:

$$W_F = C_1(1+r_1)(1+r_2)(1+r_3)(1+r_4)\ldots(1+r_{539})(1+r_{540}) +$$
$$C_2(1+r_2)(1+r_3)(1+r_4)(1+r_5)\ldots(1+r_{539})(1+r_{540}) +$$
$$C_3(1+r_3)(1+r_4)(1+r_5)(1+r_6)\ldots(1+r_{539})(1+r_{540}) +$$
$$\vdots$$
$$C_{539}(1+r_{539})(1+r_{540}) + C_{540}(1+r_{540})$$

The estimate "$W_F$" is an estimate of the wealth generated at the target date by holding a particular target date fund of one of the families "F1"-"F7" from the start date of its accumulation phase to its target date. As is apparent to those of ordinary skill, if the model 100 includes periods of the deccumulation phase, the model may include more than 540 periods. Further, the contribution pattern may be expanded to provide contributions for these periods of the deccumulation phase. Contributions used for periods occurring during the deccumulation phase may be negative (e.g., negative one dollar) indicating withdrawals.

The above formula has been provided for illustrative purposes. Those of ordinary skill in the art appreciate that alternate methods may be used to calculate wealth generated as a function of a pattern of contributions and a series of rates of return and such embodiments are within the scope of the present application. The above estimate "$W_F$" does not require any knowledge of the target date fund investment strategy, or its glide path. Only the rates of return and contributions are needed.

After the estimates "$W_F$" have been calculated for each family "F1"-"F7" in block 228, a decision is made in decision block 230 whether to compare the estimates "$W_F$" of the wealth generated by the families to one another. If the decision in block 230 is "YES," in block 232, the estimates "$W_F$" are compared to one another to determine which family is more successful at generating wealth over the accumulation phase. Then, in decision block 236, a decision is made whether to compare the estimates "$W_F$" to a benchmark wealth value "$W_B$." If the decision in block 230 is "NO," the method 200 advances to decision block 236.

If the decision in block 236 is "YES," in block 238, the benchmark wealth value "$W_B$" is obtained. Otherwise, if the decision in block 236 is "NO," the method 200 terminates.

The benchmark wealth value "$W_B$" may be obtained using the model 300. As mentioned above, it is assumed for illustrative purposes that the duration of the model 300 is divided into 540 periods. However, if the model 100 includes periods of the deccumulation phase, the model 300 may include more than 540 periods. It is further assumed that a rate of return "$b_t$" (realized or filler) has been assigned to each period "t." The value of the subscript "t" indicates to which period the rate of return has been assigned. As mentioned above, it is also assumed that an investor has made a contribution "$C_t$" in each of the periods "t." The value of the subscript "t" indicates in which period the contribution was made. With respect to any of the periods, the contribution may be equal to zero, indicating no contribution was made that period. The same contribution pattern used to calculate the estimate "$W_F$" may be used to calculate the benchmark wealth value "$W_B$." For example, it may be assumed that each of the contributions $C_1$-$C_{540}$ is one dollar. Thus, one dollar is deposited at the beginning of each of the 540 periods.

Using this information, an estimate "$W_B$" of the wealth generated by the benchmark portfolio may be calculated according to the following formula:

$$W_B = C_1(1+b_1)(1+b_2)(1+b_3)(1+b_4)\ldots(1+b_{539})(1+b_{540}) +$$
$$C_2(1+b_2)(1+b_3)(1+b_4)(1+b_5)\ldots(1+b_{539})(1+b_{540}) +$$
$$C_3(1+b_3)(1+b_4)(1+b_5)(1+b_6)\ldots(1+b_{539})(1+b_{540}) +$$
$$\vdots$$
$$C_{539}(1+b_{539})(1+b_{540}) + C_{540}(1+b_{540})$$

The benchmark wealth value "$W_B$" is an estimate of the wealth generated by the benchmark portfolio over the same number of periods used to calculate the estimate "$W_F$" for each of the families "F1"-"F7" in block 228.

The above formula for calculating the benchmark wealth value "$W_B$" has been provided for illustrative purposes. Those of ordinary skill in the art appreciate that alternate methods may be used to calculate wealth generated as a function of a pattern of contributions and a series of rates of return and such embodiments are within the scope of the present application.

After the benchmark wealth value "$W_B$" is obtained in block 238, in decision block 240, a decision is made whether to compare the estimates "$W_F$" directly to the benchmark wealth value "$W_B$." If the decision in block 240 is "YES," in block 244, the estimates "$W_F$" are compared to the benchmark wealth value "$W_B$" to determine which generated more wealth. Then, in decision block 246, a decision is made whether to calculate a ratio "TDPM" for each of the families "F1"-"F7." If the decision in block 240 is "No," the method 200 advances to the decision block 246.

If the decision in block 246 is "NO," the method 200 terminates. On the other hand, if the decision in block 246 is "YES," in block 248, for each family, the ratio "TDPM" is calculated. For each family, the ratio "TDPM" is calculated as a function of the estimate "$W_F$" and the benchmark wealth value "$W_B$." By way of a non-limiting example, for a family, the ratio "TDPM" may be equal to the estimate "$W_F$" divided by the benchmark wealth value "$W_B$" (i.e., TDPM=($W_F$/$W_B$)). If the ratio "TDPM" is greater than one, the family outperformed the benchmark wealth value "$W_B$." If the ratio is less than one, the family generated less wealth than the benchmark wealth value "$W_B$." Optionally, the ratio "TDPM" may be multiplied by a scalar, such as 100 to make the ratio "TDPM" easier for investors to evaluate. The ratio "TDPM" may be displayed using any number of decimal places.

Then, the ratios "TDPM" for each of the families "F1"-"F7" are compared to one another to determine which family is more successful at generating wealth over the accumulation phase and the method 200 terminates.

The ratio "TDPM" provides a ratio of wealth generated by each of the families "F1"-"F7" to the wealth generated by investing in the benchmark portfolio over the accumulation phase and optionally, over at least a portion of the deccumulation phase. The ratio "TDPM" may be used to compare all or portion of the target date funds of a particular family to all or a portion of the target date funds of another family.

Table 6 provides an example performance universe that provides the ratio "TDPM" for the seven families "F1"-"F7" for evaluation periods having lengths of one month, three months, six months, one year, and two years. For illustrative purpose, it is assumed the various evaluation periods all ended in December 2006.

TABLE 6

| Family | Ratio TDPM | | | | |
| --- | --- | --- | --- | --- | --- |
| | One Month evaluation period | Three Month evaluation period | Six Month evaluation period | One Year evaluation period | Two Year evaluation period |
| Family F1 | 107 | 116 | 114 | 122 | 139 |
| Family F2 | 99 | 101 | 100 | 104 | 106 |
| Family F3 | 99 | 103 | 97 | 92 | 101 |
| Family F4 | 101 | 106 | 104 | 104 | 106 |
| Family F5 | 102 | 105 | 100 | 104 | 107 |
| Family F6 | 104 | 109 | 110 | 111 | 117 |
| Family F7 | 101 | 106 | 107 | 100 | 92 |

In Table 6, the ratio "TDPM" for Family "F5" over the three months ending December 2006 is 105, which indicates Family "F5" has generated 5% more wealth over those three months than the benchmark portfolio. The ratios "TDPM" of different families over the same evaluation period can be compared directly to one another, allowing for the construction of conventional performance universes at the family level. For example, over the three months ending December 2006, the ratio "TDPM" of Family "F2" was 101 while the ratio "TDPM" of Family "F1" was 116. These values indicate that over these three months, Family "F2" generated 1% more wealth than the benchmark portfolio while Family "F1" generated 16% more. Additionally, Family "F1" outperformed Family "F2" generating about 15% more wealth than Family "F2." The ratio "TDPM" allows the construction of a meaningful performance universe.

Turning to FIG. 10, the method 400 will now be described. The method 400 is used to determine the ratio "TDPM" for a family (e.g., the Family "F1") when the evaluation period is greater than the shortest interval between two successive target date funds in the family. After the ratio "TDPM" is calculated for the family using the method 400, the ratio "TDPM" may be compared to the ratio "TDPM" of one or more other families as described above with respect to block 248 of the method 260, which is illustrated in FIG. 7.

In first block 410, the evaluation period is segmented into sub-evaluation periods, each sub-evaluation period being equal to or shorter than the shortest interval between two successive target date funds in the family. In other words, the length of the shortest interval between two successive target date funds in the family is a maximum length of a sub-evaluation period. It may be preferable to maximize the number of sub-evaluation periods having a length equal to the shortest interval between two successive target date funds in the family. For example, if the shortest interval between two successive target date funds in the family is 60 periods and the evaluation period is 72 periods, the evaluation period may be divided into a first sub-evaluation period of 60 periods and a second sub-evaluation period of 12 periods. Similarly, if the shortest interval between two successive target date funds in the family is 60 periods and the evaluation period is 132 periods, the evaluation period may be divided into a first sub-evaluation period of 60 periods, a second sub-evaluation period of 60 periods, and a third sub-evaluation period of 12 periods.

A decomposition process may be used in block 410 to segment the evaluation period into sub-evaluation periods. For example, the evaluation period may be segmented into sub-evaluation periods by subtracting a number of successive periods equal to the shortest interval between two successive target date funds in the family from the evaluation period to create a first sub-evaluation period. Any periods remaining in the evaluation period are considered part of a residual period. If the residual period is greater than the shortest interval between two successive target date funds, the number of successive periods equal to the shortest interval between two successive target date funds in the family is subtracted from the evaluation period to create a second sub-evaluation period. This is repeated until the residual period is shorter than or equal to the shortest interval between two successive target date funds. Following the decomposition process, the evaluation period is divided into a plurality of sub-evaluation periods, which include one or more sub-evaluation periods each having a length equal to the shortest interval between two successive target date funds in the family and the residual period, which has a length that is shorter than or equal to the shortest interval between two successive target date funds.

In next block 414, for each of the plurality of sub-evaluation periods, a separate model 100 is constructed for the family. In this manner, each sub-evaluation period is associated with a model 100. The block 418 is substantially similar to the block 174 of the method 160 depicted in FIG. 5, except block 418 of the method 400 repeats the functions performed by the block 174 for each model 100. In other words, in block 418, for each model 100, the realized rate of return for each period within the sub-evaluation period associated with the model is assigned to an appropriate period of the model 100.

In block 420, for each model 100, the functionality of the block 176 of the method 160 is performed to determine from how many target date funds realized rates of return were assigned to the model 100. This value is used in decision block 422 to determine whether a target date fund is missing from the family. For each model 100, decision block 422 is substantially similar to decision block 177 of the method 160. If the decision in decision block 422 is "YES," in block 426, the method 180 is performed for each of the models 100. After the method 180 is performed for each of the models 100, the method 400 advances to optional block 428.

If the decision in decision block 422 is "NO," the method 400 advances to optional block 428. In optional block 428, for each model 100, any periods of the model 100 to which a realized rate of return was not assigned in block 418 may be assigned a filler value to complete the model. If all of the periods of the model 100 were assigned realized rates of return in block 418 and/or block 426, the optional block 428 may be omitted.

In next block 430, the method 260 is performed for each sub-evaluation period to create a separate model 300 of the benchmark portfolio for each sub-evaluation period. In this manner, each of the models 300 is associated with a sub-evaluation period and the model 100 that is also associated with the same sub-evaluation period.

Next, in block 432, the estimate "$W_B$" of the wealth generated by the benchmark portfolio is obtained for each model 300 created in block 430. Each of the estimates "$W_B$" may be obtained using any method described above with respect to block 238 of the method 200 depicted in FIG. 7.

In next block 434, the estimate "$W_F$" of the wealth generated is calculated for each model 100. For each model 100, the estimate "$W_F$" is calculated in accordance with the description of block 228 of the method 200 depicted in FIG. 7.

Then, in the block 436, a ratio "TDPM" is determined for each of the models 100. The ratio "TDPM" may be determined using any method described above with respect to block 248 of the method 200. For each of the models 100, the ratio "TDPM" is obtained using the estimate "$W_B$" associated with the benchmark model 300 associated with the same sub-evaluation period as the model 100.

At this point, a ratio "TDPM" has been calculated for each model 100 associated with a sub-evaluation period. In block 438, the ratio "TDPM" values determined for each of the sub-evaluation periods are used to determine a composite ratio "TDPM" for the family for the evaluation period. By way of a non-limiting example, the ratio "TDPM" for the evaluation period may be determined by multiplying the ratio "TDPM" values determined for each sub-evaluation period together to create a product. Then, the product may be scaled by raising it to the power of a number of periods within the shortest interval between two successive target date funds in the family divided by the number of periods within the evaluation period. For example, if the number of periods within the shortest interval between two successive target date funds in the family is 60 and the number of periods within the evaluation period is 72, the product would be raised to the power of 60/72 or about 0.83. This exemplary method of scaling the product ensures that each of the rates of return used to calculate the ratio "TDPM" for the evaluation period has substantially the same influence on the ratio "TDPM." Further, the ratio "TDPM" created by the method has the same expected value as a "true" ratio "TDPM" calculated using a single target date fund over its entire accumulation phase (e.g., 540-periods).

Alternatively, in block 438, the composite ratio "TDPM" for the family for the evaluation period may be calculated by totaling the log of each of the ratio "TDPM" values and calculating the anti-log of the resulting sum. Then, the anti-log of the sum may be scaled by raising it to the power of a number of periods within the shortest interval between two successive target date funds in the family divided by the number of periods within the evaluation period. Then, the method 400 terminates.

The ratio "TDPM" determined by the method 400 for a family may be combined with other ratio "TDPM" values determined for other families to create a performance universe similar to that depicted in Table 6 above. At least a portion of the evaluation periods in the performance universe may be longer than the shortest interval between two successive target date funds in the family. The ratio "TDPM" values determined for each of the other families may have been determined in block 248 of the method 200 or in block 438 of the method 400.

Figure 11:
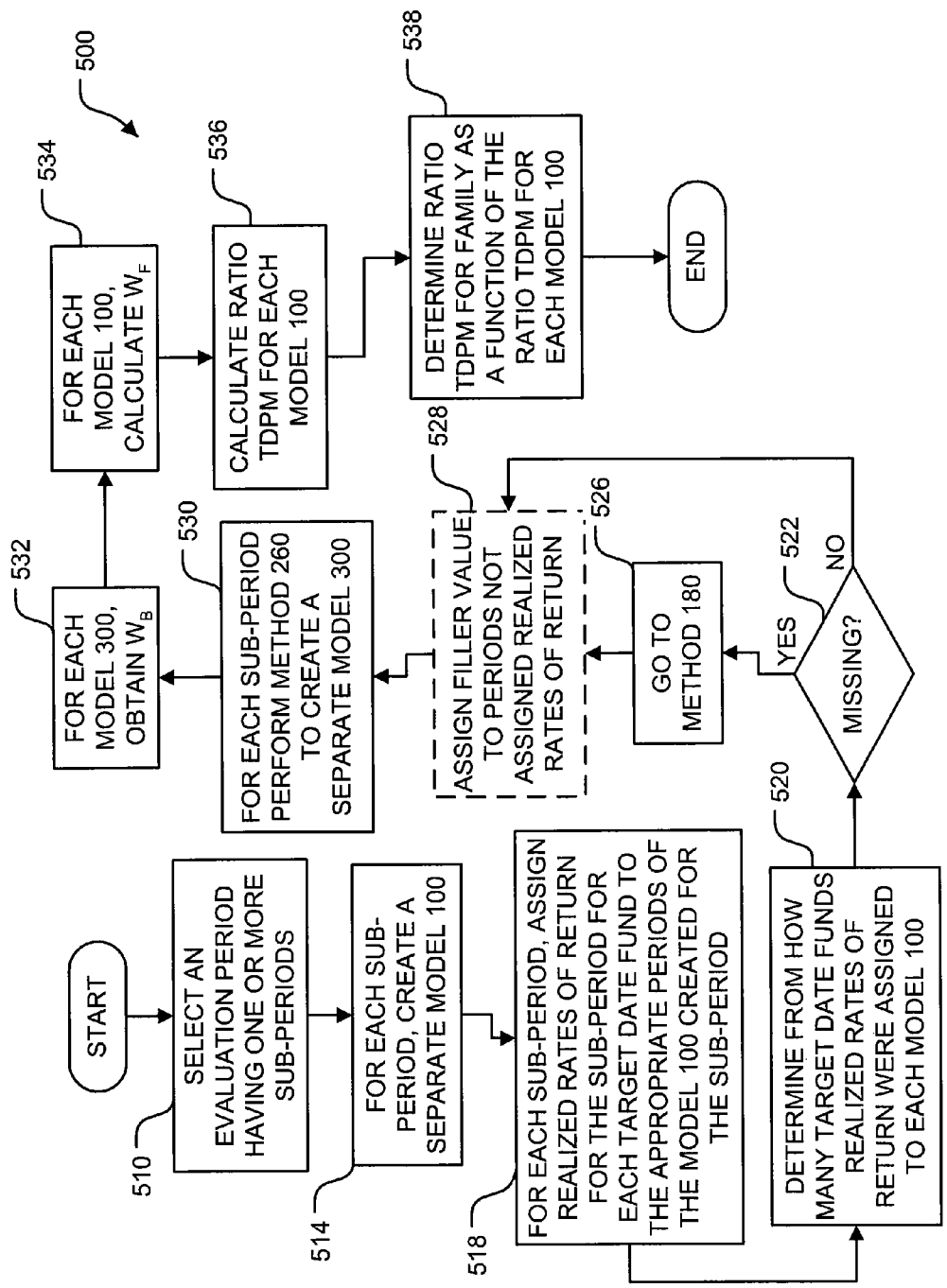
FIG. 11 is a flow diagram of an alternate method of determining a ratio "TDPM" for a family of target date funds.

FIG. 11 provides a flow diagram of an alternate embodiment of a method 500 for determining the ratio "TDPM" for a family of target date funds. In first block 510, an evaluation period having one or more sub-periods is selected. Each of the sub-periods may include any number of periods less than or equal to the number of periods within the shortest interval between two successive target date funds in the family. The evaluation period selected in block 510 may include any number of periods less than or equal to the number of periods in the accumulation and deccumulation phases combined. For illustrative purposes, it is assumed that the evaluation period includes a plurality of sub-periods each including only a single period. However, this is not a requirement. In some implementations, one or more of the sub-periods may include a number of periods that differs from the number of periods within the other sub-periods of the evaluation period.

In block 514, a model 100 is created for each sub-period within the evaluation period. Any method described above with respect to block 414 of method 400 as suitable for creating a model 100 for each sub-evaluation period may be used in block 514 to create the model 100 for each sub-period. In block 518, for each sub-period, the realized rates of return of the target date funds for the sub-period are assigned to the appropriate periods of the model 100.

In block 520, for each model 100, the functionality of the block 176 of the method 160 is performed to determine from how many target date funds realized rates of return were assigned to the model 100. This value is used in decision block 522 to determine whether a target date fund is missing from the family. For each model 100, decision block 522 is substantially similar to decision block 177 of the method 160. If the decision in decision block 522 is "YES," in block 526, the method 180 is performed for each of the models 100. After the method 180 is performed for each of the models 100, the method 500 advances to optional block 528.

If the decision in decision block 522 is "NO," the method 500 advances to optional block 528. In optional block 528, for each model 100, any periods of the model 100 to which a realized rate of return was not assigned in block 518 may be assigned a filler value to complete the model. If all of the periods of the model 100 were assigned realized rates of return in block 518 and/or block 526, the optional block 528 may be omitted.

In next block 530, the method 260 is performed for each sub-period of the evaluation period to create a separate model 300 of the benchmark portfolio for each sub-period. In this manner, each of the models 300 is associated with a sub-period and the model 100 that is also associated with the same sub-period.

Next, in block 532, the estimate "$W_B$" of the wealth generated by the benchmark portfolio is obtained for each model 300 created in block 530. Each of the estimates "$W_B$" may be obtained using any method described above with respect to block 238 of the method 200 depicted in FIG. 7.

In next block 534, the estimate "$W_F$" of the wealth generated is calculated for each model 100. For each model 100, the estimate "$W_F$" is calculated in accordance with the description of block 228 of the method 200 depicted in FIG. 7.

Then, in the block 536, a ratio "TDPM" is determined for each of the models 100. The ratio "TDPM" may be determined using any method described above with respect to block 248 of the method 200. For each of the models 100, the ratio "TDPM" is obtained using the estimate "$W_B$" associated with the benchmark model 300 associated with the same sub-period as the model 100.

At this point, a ratio "TDPM" has been calculated for each model 100 associated with a sub-period of the evaluation period. In block 538, the ratio "TDPM" values determined for each of the sub-periods are used to determine a composite ratio "TDPM" for the family for the evaluation period. By way of a non-limiting example, if each of the sub-periods includes a single period, the composite ratio "TDPM" for the family for the evaluation period may be calculated by totaling the log of each of the ratio "TDPM" values and calculating the anti-log of the resulting sum. Further, one of ordinary skill in the art through application of the ordinary skill in the art to the present teachings could adapt any of the methods described above with respect to block 438 of method 400 to determine the composite ratio "TDPM" in block 538. Then, the method 500 terminates.

The ratio "TDPM" determined by the method 500 for a family may be combined with other ratio "TDPM" values determined for other families to create a performance universe similar to that depicted in Table 6 above. Because the length of the evaluation period is limited by only the combined length of the accumulation and deccumulation phases, at least a portion of the evaluation periods in the performance universe may be longer than the shortest interval between two successive target date funds in the family. However, this is not a requirement. The ratio "TDPM" values determined for each of the other families may have been determined in block 248 of the method 200, in block 438 of the method 400, or in block 538 of the method 500.

The ratio "TDPM" whether calculated in block 248 of the method 200, in block 438 of the method 400, or in block 538 of the method 500 provides an unbiased estimate of a true ratio "TDPM" for a given family of target date funds using realized returns over the limited evaluation period. The ratio "TDPM" is related in an intuitive way to the rates of return of the all or a portion of the funds in a family as well as to the target date fund investment strategy of the family including the glide path. The ratio "TDPM" uses the timing of contributions as a typical investor saves for the significant event (e.g., retirement). The ratio "TDPM" reflects the relative importance of each fund's position on its glide path. Rates of return incorporated into the model 100 from funds near their target dates have more influence on wealth generated at the target date than rates of return from target date funds having target dates that are more distant.

The ratio "TDPM" can be thought of as a weighted composite of the returns of all the target date funds in a family. The weights are determined primarily by the pattern of cash flows or contributions (e.g., $C_1$-$C_{540}$). While in the examples presented above a uniform pattern of contributions was used, this is not a requirement, and a non-uniform pattern of contributions could be used without departing from the present teachings.

An examination of the formulas used to calculate estimate "$W_F$" and benchmark wealth value "$W_B$" demonstrates that rates of return realized nearer the target date have much more impact on the ratio "TDPM" than do rates of return realized near the start of the accumulation phase. This is a fundamental characteristic of target date funds; rates of return realized near the target date have a greater influence on the amount of wealth generated by the fund than do rates of return realized near the start of the accumulation phase because rates of return near the target date act on most of the contributions made to the fund while rates of return realized near the start of the accumulation phase act on only the early contributions. Thus, the ratio "TDPM" gives considerably more weight to the rates of return realized by those funds nearer their target date than to rates of return realized by funds farther away from their target dates. This weighting allows the ratio "TDPM" to meaningfully capture the level of success of a family of target date funds in performing their essential task of creating wealth at the target date (e.g., retirement). Further, if the contribution pattern is changed from a uniform pattern (e.g., one dollar every period) to a pattern wherein the size of the contributions grow over the duration of the accumulation phase, even more weight will be placed on the rates of return realized near the target date.

If both the estimate $W_F$ and the benchmark wealth value "$W_B$" are calculated using the same contribution pattern and the same filler value, the ratio "TDPM" for a particular family and a particular evaluation period is determined by differences in the rates of return realized by the target date funds of the family and the rates of return realized by the benchmark portfolio. While the selection of the filler value may be somewhat arbitrary, the filler value is located in the same position within the models 100 and 300. Therefore, the filler value plays the same role in both the numerator and the denominator of the ratio "TDPM." Thus, as an approximation, these filler values may "cancel out." Further, the filler values may have a small influence on the value of the ratio "TDPM."

While the above examples have included assumptions regarding the length of the accumulation phase, the time intervals between target dates in a fund family, the contribution pattern, the benchmark portfolio, and the like, these assumptions are provided for illustrative purposes and should not be interpreted as limiting. As is apparent to those of ordinary skill in the art, the examples provided for each of these values may be varied as appropriate. Further, as the realities of the target date fund marketplace evolve and industry standards are established, these assumptions may be changed. In addition, a variety of performance universes may be constructed using different assumptions, allowing the investor to select the benchmark portfolio, contribution pattern, and the like that best fits his/her views.

Figure 12:
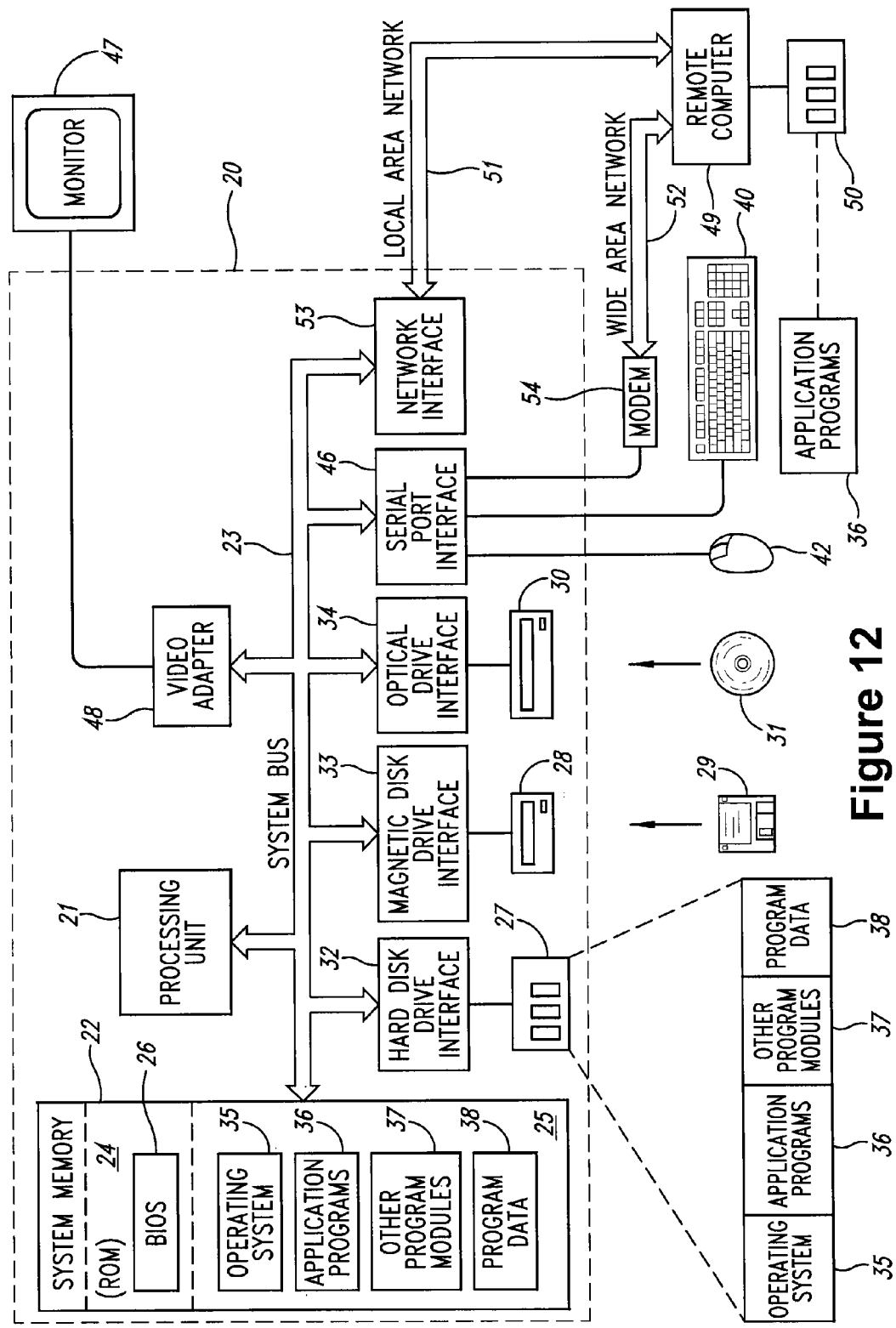
FIG. 12 is a schematic of an exemplary implementation of a computer environment that may be used to implement at least a portion of each of the methods of FIGS. 5, 6, 7, and 9.

Referring to FIG. 12, as is appreciated by those of ordinary skill in the art, the methods 160, 180, 200, 260, 400, and/or 500 or portions thereof may each be implemented on a computing device 20 and when incorporated therein construct a device configured to perform the respective method. The description of FIG. 12 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include function calls, routines, programs, objects, components, data structures, etc., that perform particular tasks or implement particular abstract data types.

Moreover, those skilled in the art will appreciate that implementations may be practiced with other computer system configurations, including hand-held devices, multiprocessor systems, microprocessor-based or programmable consumer electronics, network PCs, minicomputers, mainframe computers, and the like. Implementations may also be practiced in distributed computing environments where tasks are performed by remote processing devices that are linked through a communications network. In a distributed computing environment, program modules may be located in both local and remote memory storage devices.

The exemplary hardware and operating environment of FIG. 12 includes the computing device 20, which may be a general-purpose computing device of any type known in the art, including a processing unit 21, a system memory 22, and a system bus 23 that operatively couples various system components, including the system memory 22, to the processing unit 21. There may be only one or there may be more than one processing unit 21, such that the processor of computing device 20 comprises a single central-processing unit (CPU), or a plurality of processing units, commonly referred to as a parallel processing environment. The computing device 20 may be a conventional computer, a distributed computer, or any other type of computer.

The system bus 23 may include any bus structure including a memory bus or memory controller, a peripheral bus, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computing device 20, such as during start-up, is stored in ROM 24. The computing device 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 20. It should be appreciated by those skilled in the art that any type of computer-readable media, which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk drive 27, magnetic disk 29, optical disk 31, ROM 24, or RAM 25, including an operating system 35, one or more application programs 36, other program modules 37, and program data 38. A user may enter commands and information into the personal computing device 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus 23, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computing device 20 may operate in a networked environment using logical connections to one or more remote computers, such as remote computer 49. These logical connections are achieved by a communication device coupled to or a part of the computing device 20 (as the local computer). Implementations are not limited to a particular type of communications device. The remote computer 49 may be another computing device substantially similar to computing device 20, a server, a router, a network PC, a client, a peer device or other common network node, and typically includes many or all of the elements described above relative to the computing device 20, although only a memory storage device 50 has been illustrated in FIG. 12. The logical connections depicted in FIG. 12 include a local-area network (LAN) 51 and a wide-area network (WAN) 52. Such networking environments are commonplace in offices, enterprise-wide computer networks, intranets, and the Internet.

When used in a LAN-networking environment, the computing device 20 is connected to the local network 51 through a network interface or adapter 53, which is one type of communications device. When used in a WAN-networking environment, the computing device 20 typically includes a modem 54, or any other type of communications device for establishing communications over the wide area network 52, such as the Internet. The modem 54, which may be internal or external, is connected to the system bus 23 via the serial port interface 46. In a networked environment, program modules depicted relative to the personal computing device 20, or portions thereof, may be stored in a remote memory storage device. It is appreciated that the network connections shown are exemplary and other means of and communications devices for establishing a communications link between the computers may be used.

The computing device 20 and related components have been presented herein by way of particular example and also by abstraction in order to facilitate a high-level view of concepts involved. The actual technical design and implementation may vary based on particular implementation while maintaining the overall nature of concepts disclosed.

Figure 13:
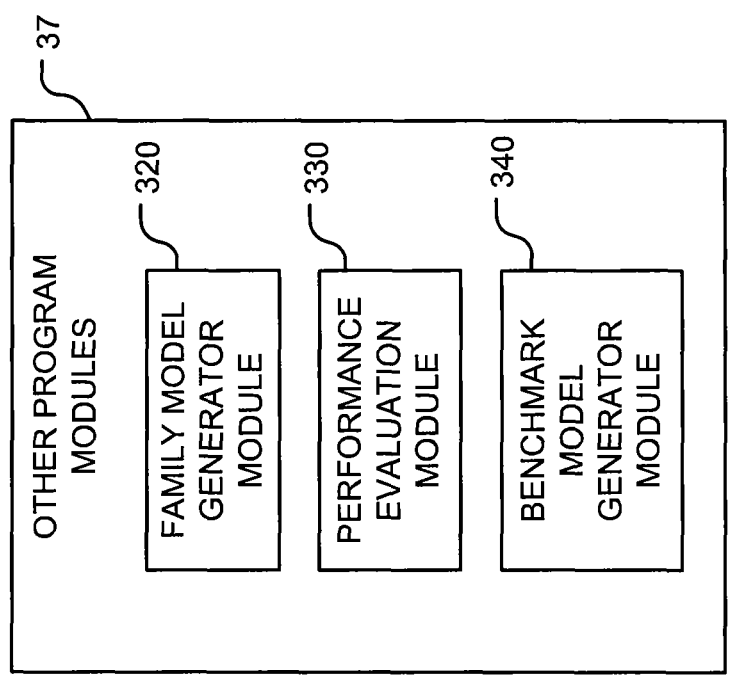
FIG. 13 is a block diagram of other programming modules stored in a memory of the computing device of the computer environment of FIG. 12.

Referring to FIG. 13, the other program modules 37 stored in memory 22 of the computing device 20 may include a family model generator module 320 having computer-executable instructions for constructing the model 100 (see FIG. 4). The module 320 may be configured to construct the model 100 for a plurality of families. Alternatively, the instructions of the module 320 may be executed for each family separately.

The module 320 has computer-executable instructions for executing at least a portion of the methods 160 and 180 (see FIGS. 5 and 6). For example, the module 320 may include computer-executable instructions for executing blocks 168, 170, 171, 172, 173, 174, 176, 177, 178, and 179 of the method 160. By way of further example, the module 320 may have computer-executable instructions for executing blocks 182, 184, 186, 188, and 189 of the method 180.

The module 320 also has computer-executable instructions for executing portions of the method 400 (see FIG. 10). For example, the module 320 may have computer-executable instructions for executing blocks 410, 414, 418, 420, 422, 426, and 428 of the method 400.

The module 320 may have computer-executable instructions for executing portions of the method 500 (see FIG. 11). For example, the module 320 may have computer-executable instructions for executing blocks 514, 518, 520, 522, 526, and 528 of the method 500.

Optionally, a user may use the input devices such as the keyboard 40 and the pointing device 42 to provide user selections to the module 320. For example, the user may select the families in block 162. The user may also select the evaluation period in block 164 of method 160. The user may select the evaluation period in block 510 of method 500. The user may also select the shorter evaluation period in block 171. Similarly, the user may also select the threshold number in block 166. The user may also select the filler value and/or benchmark portfolio used in optional block 179. In alternate implementations, the user may provide the filler value to the module 320. Alternatively, any of these selections may be made automatically by the family model generator module 320 or preprogrammed therein. The module 320 may display the model 100 or portions thereof generated for a family to the user on the display device, such as the monitor 47.

The other program modules 37 stored in memory 22 of the computing device 20 may include a performance evaluation module 330 having computer-executable instructions for evaluating the performance of a family of target date funds. The module 330 has computer-executable instructions for executing at least a portion of the method 200 (see FIG. 7). For example, the module 330 may have computer-executable instructions for executing blocks 212, 216, 220, 222, 223, 224, 225, 226, 228, 230, 232, 236, 238, 240, 244, 246, and 248 of the method 200. The module 330 has computer-executable instructions for executing at least a portion of the method 400 (see FIG. 10). For example, the module 330 may have computer-executable instructions for executing blocks 430, 432, 434, 436, and 438 of the method 400. The module 330 has computer-executable instructions for executing at least a portion of the method 500 (see FIG. 11). For example, the module 330 may have computer-executable instructions for executing blocks 530, 532, 534, 536, and 538 of the method 500.

Optionally, the user may use the input devices such as the keyboard 40 and the pointing device 42 to provide user selections to the module 330. For example, the user may enter the decisions in decision blocks 216, 222, 224, 226, 230, 236, 240, and 246. Alternatively, any of these decisions may be made automatically by the module 330 or preprogrammed therein. The module 330 may display the results and/or the comparisons of blocks 220, 225, 232, 244, and 248 or portions thereof to the user on the display device, such as the monitor 47. Further, the module 330 may display a performance universe including the ratio "TDPM" values determined for a plurality of target date fund families. The ratio "TDPM" values in the performance universe may have been determined in block 248 of the method 200, in block 438 of the method 400, and/or in block 538 of the method 500.

The other program modules 37 stored in memory 22 of the computing device 20 may include a benchmark model generator module 340 having computer-executable instructions for constructing the model 300 (see FIG. 8). The module 340 has computer-executable instructions for executing at least a portion of the method 260 (see FIG. 9). For example, the module 330 may have computer-executable instructions for executing blocks 264, 268, and 270 of the method 260. Optionally, the user may use the input devices such as the keyboard 40 and the pointing device 42 to provide user selections to the module 340. For example, the user may select the benchmark portfolio in block 262. The user may also select the filler value and/or benchmark portfolio used in optional block 270. In alternate implementations, the user may provide the filler value to the module 340. Alternatively, any of these selections may be made automatically by the benchmark model generator module 340 or preprogrammed therein. The module 340 may display the model 300 or portions thereof to the user on the display device, such as the monitor 47.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations,"

without other modifiers, typically means at least two recitations, or two or more recitations).

Accordingly, the invention is not limited except as by the appended claims.

The invention claimed is:

1. A computer-implemented method of evaluating the performance of a target date fund strategy performed by one or more computing devices, the method comprising:
   A. for each of a plurality of target date funds belonging to a family of target date funds and comprising assets associated with at least one of a plurality of asset classes, the one or more computing devices identifying an evaluation period for the assets of the target date fund for which a realized rate of return is known, the plurality of target date funds each having an accumulation phase defined by an associated start date and a target date, the accumulation phases of the target date funds being substantially identical in duration, the target date of each fund occurring at a different time, relative weighting of the asset classes within each target date fund being determined over time in accordance with the target date fund strategy which is applied to each of the target date funds over at least the accumulation phase, the evaluation periods for the target date funds corresponding to a different portion of the accumulation phase of each target date fund;
   B. the one or more computing devices obtaining the realized rate of return for the evaluation period for each target date fund; and
   C. the one or more computing devices aggregating the realized rates of return for the evaluation periods for the target date funds to create a wealth generation performance measure corresponding to the propensity of the family of target date funds to generate wealth over the accumulation phase.

2. The computer-implemented method of claim 1, wherein the evaluation period is defined as the realized return evaluation period,
   each fund has an evaluation interval comprising the realized return evaluation period,
   the evaluation intervals for the target date funds correspond to a different portion of the accumulation phase of each target date fund,
   the plurality of target date funds have intervals between their target dates the shortest of which defines the length of a maximum evaluation interval,
   the evaluation interval is equal to or shorter than the maximum evaluation interval, and
   the aggregate of the evaluation intervals of the target date funds of the plurality of target date funds is equal to or less than the length of the accumulation phase.

3. The computer-implemented method of claim 2, wherein the intervals between the target dates of the plurality of target date funds are uniform intervals that are substantially identical in length to the evaluation interval of each of the plurality of target date funds.

4. The computer-implemented method of claim 1, wherein the evaluation period is defined as the realized return evaluation period, each fund has an evaluation interval comprising the realized return evaluation period, the evaluation intervals for the target date funds correspond to a different portion of the accumulation phase of each target date fund, and the method further comprises:
   selecting a benchmark reflective of selected characteristics of the investment environment in which the plurality of target date funds are invested;
   determining a benchmark rate of return;
   assigning the benchmark rate of return to any periods of the evaluation interval other than that portion within the realized return evaluation period for each target date fund; and
   aggregating the assigned benchmark rates of return for the evaluation intervals for each of the target date funds with the realized rates of return for the realized return evaluation periods for each of the target date funds to evaluate the performance of the target date fund strategy creating a comprehensive wealth generation performance measure.

5. The computer-implemented method of claim 4, wherein a rate of return comprising one of the realized rate of return and the benchmark rate of return is associated with substantially each chronological portion of the accumulation phase, the method further comprising:
   obtaining a series of contributions representing a pattern of investor contributions to a target date fund of the family of target date funds; and
   applying the corresponding rates of return to the accumulated contributions for the associated portion of the accumulation phase to create an estimate of wealth that would be generated by the target date fund as a function of the series of contributions and as a measure of the performance of the target date fund strategy.

6. The computer-implemented method of claim 1, further comprising:
   the one or more computing devices obtaining a series of contributions representing a pattern of investor contributions to a target date fund of the family of target date funds; and
   the one or more computing devices applying the corresponding realized rates of return to the accumulated contributions for the associated portion of the accumulation phase to create an estimate of wealth that would be generated by the target date fund as a function of the series of contributions and as a measure of the performance of the target date fund strategy.

7. The computer-implemented method of claim 1, wherein the target date fund strategy comprises a glide path selected by a provider of the family of target date funds.

8. The computer-implemented method of claim 1, further comprising:
   the one or more computing devices repeating the method of claim 1 for a second target date fund strategy using a second plurality of target date funds belonging to a second family of target date funds that were created using the second target date fund strategy; and
   the one or more computing devices determining which of the first target date fund strategy and the second target date fund strategy is more successful at generating wealth by comparing the first wealth generation performance measure to the second performance measure.

9. The computer-implemented method of claim 1, further comprising:
   creating a benchmark performance measure comprising a duration identical to the duration of the accumulation phase of the plurality of target date funds, and a benchmark rate of return for each different portion of the accumulation phase of each target date fund of the plurality of target date funds corresponding to the evaluation period; and
   comparing the benchmark performance measure to the wealth generation performance measure to determine which of the family of target date funds and the benchmark is more successful at generating wealth.

10. The computer-implemented method of claim 9, wherein a realized benchmark rate of return is known for a plurality of benchmark assets for the evaluation period, and the benchmark rate of return for each different portion of the accumulation phase of each target date fund of the plurality of target date funds corresponding to the evaluation period comprises the realized benchmark rate of return.

11. The computer-implemented method of claim 1, wherein the performance measure is a first composite fund performance measure, the method further comprising:

the one or more computing devices repeating the method of claim 1 for a second target date fund strategy using a second plurality of target date funds belonging to a second family of target date funds that were created using the second target date fund strategy, the accumulation phase of the second plurality of target date funds being substantially identical in duration to the accumulation phase of the first plurality of target date funds;

obtaining a series of contributions representing a pattern of investor contributions over the duration of the accumulation phase of the first plurality of target date funds;

applying the corresponding realized rates of return of the aggregated realized rates of return of the first plurality of target date funds to the accumulated contributions for the associated portion of the accumulation phase of the first plurality of target date funds to create an estimate of the wealth that would be generated by the first target date fund strategy;

applying the corresponding realized rates of return of the aggregated realized rates of return of the second plurality of target date funds to the accumulated contributions for the associated portion of the accumulation phase of the second plurality of target date funds to create an estimate of the wealth that would be generated by the second target date fund strategy;

creating a benchmark performance measure comprising a duration substantially identical to the duration of the accumulation phase of the first plurality of target date funds, and a benchmark rate of return for each different portion of the accumulation phase of each target date fund of the first plurality of target date funds corresponding to the evaluation period;

applying the corresponding benchmark rates of return to the accumulated contributions for the associated portion of the accumulation phase of the first plurality of target date funds to create an estimate of wealth that would be generated by the benchmark as a function of the series of contributions;

calculating a first ratio as a function of the estimate of the wealth that would be generated by the first target date fund strategy and the estimate of wealth that would be generated by the benchmark;

calculating a second ratio as a function of the estimate of the wealth that would be generated by the second target date fund strategy and the estimate of wealth that would be generated by the benchmark; and determining which of the first target date fund strategy and the second target date fund strategy is more successful at generating wealth by comparing the first ratio to the second ratio.

12. A computer-implemented method performed by one or more computing devices, the method modeling performance of a family of target date funds offered by a provider, each target date fund in the family having a glide path with an accumulation phase of a predetermined duration expiring on a target date, the glide path being divided into a series of periods having a predetermined number of periods, the target dates of the target date funds being spaced apart by a predetermined interval, the method comprising:

A. the one or more computing devices creating a composite performance measure having a series of periods having the predetermined number of periods, each period of the series corresponding to a period of the glide path; and B. for each target date fund in the family of target date funds, the one or more computing devices:
  i. determining a realized rate of return for each period in a plurality of consecutive periods, each period of the plurality of consecutive periods corresponding to a period of the glide path, and
  ii. for each period of the plurality of consecutive periods, assigning the realized rate of return for the period to a period of the composite performance measure corresponding to the same period of the glide path to which the period of the plurality of consecutive periods corresponds.

13. The computer-implemented method of claim 12, further comprising:

the one or more computing devices obtaining a series of contributions, each contribution in the series corresponding to a period of the glide path; and the one or more computing devices determining an estimated monetary value of the composite performance measure as a function of the series of contributions, and the realized rates of return assigned the periods of at least a first portion of the series of periods of the composite performance measure.

14. The computer-implemented method of claim 12, further comprising the one or more computing devices assigning a filler benchmark rate of return to each period of a second portion of the series of periods of the composite performance measure, the second portion comprising any periods of the series of periods to which a realized rate of return was not assigned.

15. The computer-implemented method of claim 14, wherein the one or more computing devices assign the same filler benchmark rate of return to each period of the second portion of the series of periods of the composite performance measure.

16. The computer-implemented method of claim 14, further comprising:

the one or more computing devices obtaining a series of contributions, each contribution in the series corresponding to a period of the glide path; and the one or more computing devices determining an estimated monetary value of the composite performance measure as a function of the series of contributions, the realized rates of return assigned the periods of a first portion of the series of periods of the composite performance measure, and the filler benchmark rate of return assigned to the periods of the second portion of the series of periods of the composite performance measure.

17. The computer-implemented method of claim 14, wherein the one or more computing devices determine the filler benchmark rate of return as a function of an expected rate of return of the plurality of benchmark assets.

18. A computer-implemented method of creating a benchmark performance measure for evaluating the performance of a family of target date funds offered by a provider, each target date fund in the family having a glide path divided into a series of periods having a predetermined number of periods, the benchmark performance measure comprising a benchmark series of periods having the predetermined number of periods, each period of the benchmark series corresponding to a period of the glide path; the method being performed by one or more computing devices and comprising:

A. the one or more computing devices selecting one or more periods of the benchmark series of periods;

B. for each target date fund in the family of target date funds, the one or more computing devices identifying a portion of the glide path corresponding to the one or more selected periods;

C. the one or more computing devices determining realized rates of return for a plurality of benchmark assets for the one or more selected periods; and D. for each portion of the glide path identified as corresponding to the one or more selected periods, the one or more computing devices assigning the realized rates of return for the plurality of benchmark assets to the one or more selected periods of the benchmark series of periods corresponding to the portion of the glide path identified.

19. The computer-implemented method of claim 18, further comprising:

the one or more computing devices obtaining a series of contributions, each contribution in the series corresponding to a period of the glide path; and the one or more computing devices determining an estimated monetary value of the benchmark performance measure as a function of the series of contributions, and the realized rates of return assigned the periods of at least a first portion of the series of periods of the benchmark performance measure.

20. The computer-implemented method of claim 18, further comprising the one or more computing devices assigning a filler benchmark rate of return to each period of a second portion of the benchmark series of periods, the second portion comprising any periods of the benchmark series of periods to which a realized rate of return for the plurality of benchmark assets has not been assigned.

21. The computer-implemented method of claim 20, wherein the one or more computing devices determine the filler benchmark rate of return as a function of an expected rate of return of the plurality of benchmark assets.

22. The computer-implemented method of claim 20, further comprising:

the one or more computing devices obtaining a series of contributions, each contribution in the series corresponding to a period of the glide path; and the one or more computing devices determining an estimated monetary value of the benchmark performance measure as a function of the series of contributions, the realized rates of return assigned the periods of a first portion of the series of periods of the benchmark performance measure, and the filler benchmark rate of return assigned to the periods of the second portion of the series of periods of the benchmark performance measure.

23. A computer-implemented method performed by one or more computing devices, the method comprising:

the one or more computing devices identifying a family of target date funds, each target date fund of the family having a plurality of assets belonging to at least one asset class and an accumulation phase of substantially equivalent duration but ending on different target dates, the plurality of assets of each target date fund of the family varying with time over the accumulation phase in accordance with a substantially identical but unknown investment strategy, the investment strategy being known to comprise a series of asset class selections each corresponding to a predetermined portion of the accumulation phase, each asset class selection identifying at least one asset class from which to select the plurality of assets and for each at least one asset class, a weighting of the at least one asset class relative to any other asset classes in the asset class selection;

the one or more computing devices identifying an evaluation portion of the accumulation phase of the family of target date funds, for each target date fund, the evaluation portion being offset from the target date by a first offset amount;

the one or more computing devices obtaining at least one realized rate of return for the plurality of assets in each target date fund over the evaluation portion; and the one or more computing devices creating a model of the performance of the family of target date funds having a duration substantially identical to the duration of the accumulation phase of the target date funds, the duration of the model ending on an end date, creating the model comprising assigning the at least one realized rate of return obtained for each target date fund to a period of the model offset from the end date of the model by the first offset amount, wherein during the evaluation portion, a selected target date fund comprises a plurality of assets selected in accordance with one or more asset class selections of the investment strategy corresponding to the one or more of the predetermined portions of the accumulation phase falling within the evaluation portion, wherein for each earlier target date fund having a target date earlier than the target date of the selected target date fund by a second offset amount, the one or more asset class selections of the earlier target date fund over a period of the accumulation phase that is later than the evaluation portion by the second offset amount are substantially identical to one or more asset class selections of the selected target date fund falling within the evaluation portion, and wherein for each later target date fund having a target date that is later than the target date of the selected target date fund by a third offset amount, the one or more asset class selections of the later target date fund over a period of the accumulation phase that is earlier than the evaluation portion by the third offset amount are substantially identical to one or more asset class selections of the selected target date fund falling within the evaluation portion.

24. The computer-implemented method of claim 23, wherein the family of target date funds is a first family and the model of the performance of the first family of target date funds is a first model, the method further comprising:

the one or more computing devices repeating the method of claim 23 for a second family of target date funds to create a second model of the performance of the second family of target date funds;

the one or more computing devices obtaining a series of contributions, each contribution corresponding to a contribution period falling within the accumulation phase;

the one or more computing devices calculating a first estimate of an amount of wealth generated by investing in the first family of target date funds using the first model and the series of contributions;

the one or more computing devices calculating a second estimate of an amount of wealth generated by investing in the second family of target date funds using the second model and the series of contributions; and the one or more computing devices comparing the first estimate to the second estimate to determine which of the first family and the second family is more successful at generating wealth.

25. The computer-implemented method of claim 23, wherein comparing the first estimate to the second estimate to determine which of the first family and the second family is more successful at generating wealth comprises:
- selecting a benchmark comprising a plurality of assets;
- obtaining at least one realized benchmark rate of return for the plurality of assets of the benchmark over the evaluation portion;
- creating a benchmark model of the performance having a duration substantially identical to the duration of the accumulation phase of the first family of target date funds, the duration of the model ending on an end date, creating the benchmark model of the performance comprising for each target date fund in the first family, assigning the at least one realized benchmark rate of return to a period of the accumulation phase offset from the end date of the benchmark model by the first offset amount;
- calculating a benchmark estimate of an amount of wealth generated by investing in the benchmark using the benchmark model and the series of contributions;
- calculating a first ratio of the first estimate of the amount of wealth generated by investing in the first family of target date funds to the benchmark estimate of the amount of wealth generated by investing in the benchmark;
- calculating a second ratio of the second estimate of the amount of wealth generated by investing in the second family of target date funds to the benchmark estimate of the amount of wealth generated by investing in the benchmark; and
- determining which of the first family and the second family is more successful at generating wealth by comparing the first ratio to the second ratio.

26. The computer-implemented method of claim 25, wherein the plurality of assets of the benchmark change over the accumulation phase.

27. A computer-implemented method for use with a family of target date funds offered by a provider, each target date fund in the family having a glide path with an accumulation phase of a predetermined duration expiring on a target date, the glide path being divided into a series of periods having a predetermined number of periods, the target dates of the target date funds being spaced apart by a predetermined interval, the method being performed by one or more computing devices and comprising:
- the one or more computing devices identifying an evaluation period having a plurality of sub-periods;
- for each sub-period, the one or more computing devices creating a composite performance measure having a series of periods having the predetermined number of periods, each period of the series corresponding to a period of the glide path, and for each target date fund in the family of target date funds:
  - determining a realized rate of return for each period in the sub-period, each period of the sub-period corresponding to a period of the glide path, and
  - for each period of the sub-period, assigning the realized rate of return for the period to a period of the composite performance measure corresponding to the same period of the glide path to which the period of the sub-period corresponds;
- for each sub-period, the one or more computing devices creating a benchmark performance measure having a series of periods having the predetermined number of periods, each period of the series corresponding to a period of the glide path, and for each target date fund in the family of target date funds:
  - determining a benchmark realized rate of return for a benchmark portfolio for each period in the sub-period, each period of the sub-period corresponding to a period of the glide path of the target date fund, and
  - for each period of the sub-period, assigning the benchmark realized rate of return for the period to a period of the benchmark performance measure corresponding to the same period of the glide path to which the period of the sub-period corresponds;
- the one or more computing devices obtaining a series of contributions, each contribution in the series corresponding to a period of the glide path;
- for each sub-period, the one or more computing devices determining an estimated monetary value of the composite performance measure as a function of the series of contributions, and the realized rates of return assigned the periods of at least a first portion of the series of periods of the composite performance measure;
- for each sub-period, the one or more computing devices determining an estimated monetary value of the benchmark performance measure as a function of the series of contributions, and the realized rates of return assigned the periods of at least a first portion of the series of periods of the benchmark performance measure;
- for each sub-period, the one or more computing devices determining a ratio of the estimated monetary value of the composite performance measure to the estimated monetary value of the benchmark performance measure; and
- the one or more computing devices determining a composite ratio as a function of the ratio determined for each sub-period, the composite ratio indicating the performance of the family of target date funds relative to the benchmark portfolio over the evaluation period.

28. The computer-implemented method of claim 27, further comprising:
- the one or more computing devices assigning a filler benchmark rate of return to each period of a second portion of the series of periods of the composite performance measure, the second portion comprising any periods of the series of periods to which a realized rate of return was not assigned; and
- the one or more computing devices assigning the filler benchmark rate of return to each period of a second portion of the series of periods of the benchmark performance measure, the second portion comprising any periods of the series of periods to which a realized rate of return was not assigned.

29. The computer-implemented method of claim 28, wherein
- the estimated monetary value of the composite performance measure is also determined as a function of the filler benchmark rate of return assigned to the periods of the second portion of the series of periods of the composite performance measure, and
- the estimated monetary value of the benchmark performance measure is also determined as a function of the filler benchmark rate of return assigned to the periods of the second portion of the series of periods of the benchmark performance measure.

30. The computer-implemented method of claim 27, wherein determining the composite ratio as a function of the ratio determined for each sub-period comprises multiplying the ratios determined for each sub-period together to obtain a product and raising the product to a power of a maximum number of periods in the sub-periods divided by the number of periods in the evaluation period.

31. The computer-implemented method of claim 27, wherein determining the composite ratio as a function of the ratio determined for each sub-period comprises determining a log of each of the ratios determined for each of the sub-periods, adding the logs of each of the ratios together to obtain a sum, and determining an anti-log of the sum.

32. The computer-implemented method of claim 31, wherein determining the composite ratio as a function of the ratio determined for each sub-period comprises raising the anti-log of the sum to a power of a maximum number of periods in the sub-periods divided by the number of periods in the evaluation period.

33. A computer-implemented method of evaluating the performance of a target date fund strategy performed by one or more computing devices, the method comprising:
   A. for each of a plurality of target date funds belonging to a family of target date funds and comprising assets associated with at least one of a plurality of asset classes, the one or more computing devices identifying an evaluation period for the assets of the target date fund for which a realized rate of return is known, the plurality of target date funds each having an accumulation phase defined by an associated start date and a target date, the accumulation phases of the target date funds being substantially identical in duration, the target date of each fund occurring at a different time, relative weighting of the asset classes within each target date fund being determined over time in accordance with the target date fund strategy which is applied to each of the target date funds over at least the accumulation phase, the evaluation periods for the target date funds corresponding to a different portion of the accumulation phase of each target date fund;
   B. the one or more computing devices obtaining the realized rate of return for the evaluation period for each target date fund;
   C. the one or more computing devices aggregating the realized rates of return for the evaluation periods for the target date funds to create a wealth generation performance measure corresponding to the propensity of the family of target date funds to generate wealth over the accumulation phase;
   D. the one or more computing devices estimating a realized rate of return for the evaluation period for a missing target date fund as a function of the realized rates of return of at least a portion of the plurality of target date funds belonging to a family of target date funds; and
   E. the one or more computing devices aggregating the estimated realized rate of return for the evaluation period for the missing target date fund with the aggregated realized rates of return for the evaluation periods for each of the target date funds to create the wealth generation performance measure corresponding to the propensity of the family of target date funds to generate wealth over the accumulation phase.

34. The computer-implemented method of claim 33, wherein estimating a realized rate of return for the evaluation period for the missing target date fund comprises:
   determining the missing target date fund has a target date between the target dates of a pair of target date funds of the plurality of target date funds; and
   averaging the realized rates of return for the evaluation period for the pair of target date funds.

35. The computer-implemented method of claim 33, wherein estimating a realized rate of return for the evaluation period for the missing target date fund comprises:
   determining the missing target date fund has a target date that is later than the latest target date of the plurality of target date funds;
   identifying a pair of target date funds having the latest target dates within the plurality of target date funds; and
   interpolating the realized rate of return for the evaluation period for the missing target date fund from the realized rates of return for the evaluation period of the pair of target date funds.

36. A computer-implemented method of evaluating the performance of a target date fund strategy performed by one or more computing devices, the method comprising:
   A. for each of a plurality of target date funds belonging to a family of target date funds and comprising assets associated with at least one of a plurality of asset classes, the one or more computing devices identifying an evaluation period for the assets of the target date fund for which a realized rate of return is known, the plurality of target date funds each having an accumulation phase defined by an associated start date and a target date, the accumulation phases of the target date funds being substantially identical in duration, the target date of each fund occurring at a different time, relative weighting of the asset classes within each target date fund being determined over time in accordance with the target date fund strategy which is applied to each of the target date funds over at least the accumulation phase, the evaluation periods for the target date funds corresponding to a different portion of the accumulation phase of each target date fund;
   B. the one or more computing devices obtaining the realized rate of return for the evaluation period for each target date fund;
   C. the one or more computing devices aggregating the realized rates of return for the evaluation periods for the target date funds to create a wealth generation performance measure corresponding to the propensity of the family of target date funds to generate wealth over the accumulation phase;
   D. the one or more computing devices creating a benchmark performance measure comprising a duration identical to the duration of the accumulation phase of the plurality of target date funds, and a benchmark rate of return for each different portion of the accumulation phase of each target date fund of the plurality of target date funds corresponding to the evaluation period, wherein a realized benchmark rate of return is known for a plurality of benchmark assets for the evaluation period, and the benchmark rate of return for each different portion of the accumulation phase of each target date fund of the plurality of target date funds corresponding to the evaluation period comprises the realized benchmark rate of return;
   E. the one or more computing devices determining a filler benchmark rate of return;
   F. the one or more computing devices assigning the filler benchmark rate of return to any periods of the benchmark performance measure to which the realized benchmark rate of return was not assigned; and
   G. the one or more computing devices comparing the benchmark performance measure to the wealth generation performance measure to determine which of the family of target date funds and the benchmark is more successful at generating wealth.

37. The computer-implemented method of claim 36, wherein the filler benchmark rate of return is determined as a function of an expected rate of return of the plurality of benchmark assets.

38. A computer-implemented method of evaluating the performance of a target date fund strategy performed by one or more computing devices, the method comprising:
- A. for each of a plurality of target date funds belonging to a family of target date funds and comprising assets associated with at least one of a plurality of asset classes, the one or more computing devices identifying an evaluation period for the assets of the target date fund for which a realized rate of return is known, the plurality of target date funds each having an accumulation phase defined by an associated start date and a target date, the accumulation phases of the target date funds being substantially identical in duration, the target date of each fund occurring at a different time, relative weighting of the asset classes within each target date fund being determined over time in accordance with the target date fund strategy which is applied to each of the target date funds over at least the accumulation phase, the evaluation periods for the target date funds corresponding to a different portion of the accumulation phase of each target date fund;
- B. the one or more computing devices obtaining the realized rate of return for the evaluation period for each target date fund;
- C. the one or more computing devices aggregating the realized rates of return for the evaluation periods for the target date funds to create a wealth generation performance measure corresponding to the propensity of the family of target date funds to generate wealth over the accumulation phase;
- D. the one or more computing devices creating a benchmark performance measure comprising a duration identical to the duration of the accumulation phase of the plurality of target date funds, and a benchmark rate of return for each different portion of the accumulation phase of each target date fund of the plurality of target date funds corresponding to the evaluation period;
- E. the one or more computing devices comparing the benchmark performance measure to the wealth generation performance measure to determine which of the family of target date funds and the benchmark is more successful at generating wealth;
- F. the one or more computing devices obtaining a series of contributions representing a pattern of investor contributions to a target date fund of the family of target date funds;
- G. the one or more computing devices applying the corresponding benchmark rates of return to the accumulated contributions for the associated portion of the accumulation phase to create an estimate of wealth that would be generated by the benchmark as a function of the series of contributions;
- H. the one or more computing devices applying the corresponding realized rates of return to the accumulated contributions for the associated portion of the accumulation phase to create an estimate of wealth that would be generated by the target date fund as a function of the series of contributions; and
- I. the one or more computing devices comparing the estimate of wealth that would be generated by the target date fund to the estimate of wealth that would be generated by the benchmark to determine which of the target date fund and benchmark is more successful at generating wealth.

39. The computer-implemented method of claim 38, wherein comparing the estimate of wealth that would be generated by the target date fund to the estimate of wealth that would be generated by the benchmark comprises calculating a ratio of the estimate of wealth that would be generated by the target date fund to the estimate of wealth that would be generated by the benchmark.

* * * * *